United States Patent
Brown et al.

(10) Patent No.: US 7,252,836 B2
(45) Date of Patent: Aug. 7, 2007

(54) FOOD AND FEED COMPOSITIONS INCLUDING RESISTANT STARCH

(75) Inventors: Ian Lewis Brown, Gymea Bay (AU); Bill L. Miller, Fort Dodge, IA (US); Wallace H. Kunerth, Parker, CO (US)

(73) Assignees: Penwest, Ltd., Bellevue, WA (US); Land O'Lakes Farmland Feed LLC., Arden Hills, MN (US)

( * ) Notice: Subject to any disclaimer, the term of this patent is extended or adjusted under 35 U.S.C. 154(b) by 444 days.

(21) Appl. No.: 10/340,935

(22) Filed: Jan. 13, 2003

(65) Prior Publication Data

US 2004/0137038 A1    Jul. 15, 2004

(51) Int. Cl.
*A23K 1/18* (2006.01)

(52) U.S. Cl. .................. 424/438; 426/2; 424/442

(58) Field of Classification Search ............. 424/438, 424/442; 426/2
See application file for complete search history.

(56) References Cited

U.S. PATENT DOCUMENTS

| | | | |
|---|---|---|---|
| 3,925,560 A | 12/1975 | Scott et al. | |
| 4,247,562 A | 1/1981 | Bernotavicz | |
| 4,497,800 A | 2/1985 | Larson et al. | |
| 4,707,375 A | 11/1987 | Buckley et al. | |
| 5,614,501 A | 3/1997 | Richards | |
| 5,714,600 A | 2/1998 | McNaught et al. | |
| 5,776,887 A * | 7/1998 | Wibert et al. ................. | 514/2 |
| 5,840,860 A | 11/1998 | Annison et al. | |
| 5,855,946 A | 1/1999 | Seib et al. | |
| 5,958,898 A | 9/1999 | Hayek et al. | |
| 6,019,995 A | 2/2000 | Steensma | |
| 6,060,050 A * | 5/2000 | Brown et al. ............... | 424/93.3 |
| 6,071,544 A | 6/2000 | Sunvold | |

(Continued)

FOREIGN PATENT DOCUMENTS

AU        PL6537        12/1992

(Continued)

OTHER PUBLICATIONS

Golan et al , Small Ruminant Research vol. 3 # 4 pp. 341-351, , 1990.*

(Continued)

*Primary Examiner*—Neil S. Levy
(74) *Attorney, Agent, or Firm*—Marshall, Gerstein & Borun LLP

(57) ABSTRACT

The invention described in this application relates to a method of increasing the amount of weight gained by the mammal during a feeding period, to a method of increasing the amount of milk replacer consumed by the mammal during a feeding period, to a method of decreasing the amount of scour of the ruminant during a feeding period, to a method of decreasing the amount of respiratory distress of the mammal during a feeding period, to a method of feeding the ruminant, to a mammal ration, to a daily mammal ration, to a method of feeding mammals an animal feed that contains resistant starch, and to a method of increasing the feed efficiency of a mammal during a feeding period that entails feeding the mammal an effective amount of a fluid animal feed during the feeding period and feeding the mammal an effective amount of resistant starch during the feeding period.

16 Claims, 1 Drawing Sheet

U.S. PATENT DOCUMENTS

| | | | |
|---|---|---|---|
| 6,087,092 | A | 7/2000 | Richards |
| 6,190,591 | B1 | 2/2001 | van Lengerich |
| 6,221,350 | B1 | 4/2001 | Brown et al. |
| 6,238,708 | B1 | 5/2001 | Hayek et al. |
| 6,245,326 | B1 | 6/2001 | Topping et al. |
| 6,303,174 | B1 | 10/2001 | McNaught et al. |
| 6,348,452 | B1 | 2/2002 | Brown et al. |
| 2002/0012985 | A1 | 1/2002 | Takebe et al. |

FOREIGN PATENT DOCUMENTS

| | | |
|---|---|---|
| EP | 747397 | 12/1996 |
| EP | 691807 | 9/1999 |
| EP | 108832 | 4/2001 |
| EP | 1155623 | 11/2001 |
| WO | WO 94/03049 | 2/1994 |
| WO | WO 99/00136 | 7/1999 |
| WO | WO 00/38537 | 7/2000 |
| WO | WO 00/41576 | 7/2000 |
| WO | WO 00/53030 | 9/2000 |
| WO | WO 01/02016 | 1/2001 |
| WO | WO 01/76394 | 10/2001 |
| WO | WO 02/02102 | 1/2002 |

OTHER PUBLICATIONS

Nitsan etal , Small Ruminant Research vol. 3 # 4 pp. 325-339, 1990.*

Brown, et al., "Hi-maize™: new directions in starch technology and nutrition," *Food Australia* 47:272-275 (1995).

Cluskey et al., "Fractionation and Characterization in Dent Corn and Amylomaize Starch Granules," *Starke* 32(4S):105-109 (1980).

McCleary et al., "A Rapid Procedure for Total Starch Measurement in Cereal Grains and Products," Proc. 42$^{nd}$ RACI Cereal Chem. Conf.:304-312; Christchurch, New Zealand, Ed. V.J. Humphrey-Taylor (1992).

Muir et al., "Measurement of Resistant Starch Factors Affecting Starch Escaping Digestion in Vitro," *Am. J. Clin. Nutr.* 56:123-127 (1992).

*Official Methods of Analysis, Association of Official Analytical Chemists (AOAC)*, Method # 991.20 (33.2.11); Method # 925.23 (33.2.09), 16$^{th}$ Ed. AOAC Int'l, Gaithersburg, MD, Ed. P. Cunniff (1996). (Table of Contents only).

*Guide for the Care and Use of Agricultural Animals in Agricultural Research and Training*, 1$^{st}$ Ed., Consortium for Developing a Guide for the Care and Use of Agricultural Animals in Agricultural Research and Teaching, Champaign, IL (Mar. 1988).

DeGroot et al., "Observation in rats fed on diets containing five different chemically modified starches," *Report No. 3096*, Central Instituut Voor Voedingsonderzoek, Holland, (Central Institute for Nutrition and Food Research) (1970).

DeGroot et al., "Two five-year feeding and multigenerational studies in rats on five chemically modified starches," *Fd. Cosmet Toxicol*, 12: 651-663 (Pergamon Press, Great Britain), 1974.

Leegwater, D.C. "Metabolism of hydroxypropyl starch in rat," *Report No. 3209*, Central Instituut Voor Voedingsonderzoek, Holland (Central Institute for Nutrition and Food Research), (1970).

Leegwater, D.C. "Preliminary results of a multi-generation study in rats with five chemically modified starches," *Report No. F.3431*, Central Instituut Voor Voedingsonderzoek, Holland (Central Institute for Nutrition and Food Research) (1971).

Til et al., "Chronic (two year) feeding study with rats with chemically modified starches (starch acetate and hydroxypropyl distarch glycerol)," (Preliminary Report), *Report No. 3363*,(Central Instituut Voor Voedingsonderzoek, Holland, (Central Institute for Nutrition and Food Research) (1971).

* cited by examiner

FOOD AND FEED COMPOSITIONS INCLUDING RESISTANT STARCH

TECHNICAL FIELD

This invention generally relates to food compositions for humans that include resistant starch as a source of dietary fiber, to animal feed compositions that include resistant starch as a source of dietary fiber, and to a method of feeding animals. More particularly, this invention relates both to food compositions and animal feed compositions that include plants, grains, or parts thereof and resistant starch derived from the plant or grain. This method also particularly relates to a method of feeding animals, especially ruminants and monogastrics, prior to weaning, an animal feed that contains resistant starch.

BACKGROUND

It has been recognized that a balanced diet should include an adequate level of dietary fiber. There are many natural food sources of dietary fiber such as cereals, particularly bran, that are recognized as good dietary fiber sources.

However, it would seem that a high proportion of diets of people of the developed countries contain an inadequate level of dietary fiber. An inadequate level of dietary fiber has been linked with a number of diseases that may be broadly classified as metabolic and gastrointestinal. Some examples of these diseases are diabetes mellitus, diverticular disease and colonic cancer. It has also been found that some forms of dietary fiber are useful in lowering blood cholesterol.

Additionally, some types of fiber have been prescribed for reducing scours in calves, and a Plantago seed supplement has been described to help reduce animal stress conditions, prevent or treat scours, and promote the growth of ruminants. Also, some fiber supplements have been described for increasing the rate of weight gain per unit weight of protein consumed by ruminants and monogastrics.

One attempted approach to providing adequate levels of dietary fiber has entailed manufacturing processed foods that have a high dietary fiber content. Such foods include breakfast cereals, snack bars, bread and the like. Typically bran, especially outer tissues of the kernel, including pericarp from a variety of cereal sources such as wheat, maize or corn, oats, rice, pea and other pulses, barley, triticale, sorghum, milo, potato, tapioca, cassaya, sago and other plant extracts have been used as fiber sources.

More recently, resistant starches have been recognized as a potential source of dietary fiber. Resistant starches are starches that are highly resistant to hydration and, when ingested, pass through the upper regions of the gastrointestinal tract largely unchanged.

To date the only natural sources that contain a significant amount of resistant starch are green bananas and raw potatoes. Such resistant starch sources do, however, present substantial problems in formulating satisfactory food products, such as low gelatinization temperatures that are typically on the order of about 60° C. to about 80° C. It is also possible to produce resistant starch by extensively processing, namely repeatedly cooking and cooling, starch pastes.

Copending International Patent Application No. PCT/AU93/00389 that was filed on Jul. 30, 1993 and is entitled "High Amylose Starch and Resistant Starch Fractions" discloses a hybrid maize seed that is capable of yielding a starch having an amylose content of more than about 80%. Application No. PCT/AU93/00389 further discloses a maize starch derived from such seed having an amylose content of more than about 80%. This starch was designated as "High Amylose Starch" in view of the surprising high amylose content. A number of examples of compositions including high amylose starch with a variety of different number of food applications were given in Application No. PCT/AU93/00389 and U.S. Pat. No. 6,303,174 B1.

Surprisingly, it was found that the aforementioned high amylose starch is high in dietary fiber content and is a resistant starch. Moreover, it was found that such starches may be advantageously incorporated into food products to achieve enhanced levels of dietary fiber content. Additionally, these starches have relatively high gelatinization temperatures, typically on the order of about 160° C. to about 170° C.

Also of interest to the present invention is information relating to the occurrence and treatment of scours (i.e. diarrhea and dysentery), especially in ruminants. Ruminants, such as cattle, have a four compartment stomach, as opposed to the single stomach that human beings have. Two of these stomach compartments are the abomasum and the rumen. In a mature ruminant, fermentation of feed in the rumen provides the majority of energy and protein to the ruminant. On the other hand, in a newborn ruminant, the rumen is substantially undeveloped and the abomasum is the primary stomach compartment for digestion and nutrient assimilation. Consequently, young ruminants are typically fed a liquid diet that is digestible in the abomasum. This liquid diet initially only contains readily digestible nutrients, since the abomasum is incapable of digesting sufficient amounts of more complex nutrients that typically form the majority of the nutrition found in solid feeds.

While still being fed the liquid diet that is digestible in the abomasum, young ruminants are gradually introduced to a solid feed that contains readily digestible carbohydrates to support development of the rumen. Volatile fatty acids produced during fermentation of readily digestible carbohydrates support rumen tissue development and therefore control the rate of rumen development. Also, volatile fatty acids that are produced in the rumen help support development of microorganisms that break down the solid feed and transform components of the solid feed into microbial protein and volatile fatty acids. After the rumen has developed sufficiently to support the nutritional requirements of the young ruminant, the liquid diet is typically withdrawn and the nutritional requirements of the young ruminant are thereafter generally supplied by solid feed.

Weaning occurs when liquid feed is withdrawn from the diets of young mammals, such as young ruminants. As used herein, the term "mammal" refers to non-human animals. Thus, as used herein, the term "pre-weaning period" refers to the period when nutrients are predominantly or entirely supplied in liquid form to mammals, such as ruminants (including calves) or monogastrics (including pigs), as part of the liquid feed. Correspondingly, the term "post-weaning period" refers to the period when nutrients are no longer predominantly or entirely provided to mammals, such as ruminants (including calves) or monogastrics (including pigs), in the form of liquid feed. The post-weaning period for ruminants is sometimes also referred to as the "ruminant period."

For ruminants, the pre-weaning period may also be broken down into a pre-ruminant period and a transition period. The "pre-ruminant period" is the time period when only nutrients in liquid form (as the liquid feed) are provided to the young ruminant. The "transition period" is the time period when the young ruminant is continuing to receive liquid nutrients while also receiving gradually increasing amounts of solid feed, such as dry calf starter, to support development of the rumen in anticipation of weaning. The transition period (and thus also the pre-weaning period) ends, and the post-weaning period (also referred to as the ruminant period for ruminants) begins when the liquid feed that supplies liquid nutrients is predominantly or entirely withdrawn from the young ruminant's diet and the young ruminant is predominantly or entirely fed only solid feed, such as dry calf starter.

Typical liquid feeds for young mammals, such as young ruminants and monogastrics, include fluid milk or fluid milk replacers. Fluid milk replacers are frequently substituted in place of fluid milk because fluid milk that is produced by mature, lactating mammals, especially milk produced by mature, lactating ruminants, is generally more valuable when sold to consumers or when used to manufacture food products that are sold to consumers. Thus, fluid milk replacers that are produced to simulate fluid milk are generally substituted in place of fluid milk for feeding young mammals, especially when feeding young ruminants and monogastrics. Fluid milk replacers may be based upon dairy components and non-dairy components that are combined to provide nutrient and palatability characteristics approximating the nutrient and palatability characteristics of fluid milk. Milk replacers are typically marketed in powdered form to avoid the higher transportation and storage costs of distributing fluid milk replacer. Powdered, pelleted, and granular milk replacers are mixed with water prior to use to form fluid milk replacers that are provided to the young mammals. The formulation and feeding of fluid milk replacers is well-known in the art.

Young mammals, when provided only with nutrients in liquid form (as the liquid feed), are quite susceptible to diarrhea and dysentery especially during the pre-ruminant period for young ruminants or during the pre-weaning period for ruminants and non-ruminants alike. These instances of diarrhea and dysentery are sometimes characterized as scours, especially in the field of veterinary medicine. Scours may seriously compromise the health of affected young mammals (such as young ruminants and young monogastrics) by causing loss of water, bicarbonate, and electrolytes, such as sodium ions and potassium ions, from the blood and body fluids of the young mammals. A number of different factors, such as mechanical (higher feeding rates—especially for milk and fluid milk replacers), nutritional (feed quality), and/or environmental (stress and/or disease) factors, may contribute to scours development and progression in young mammals, such as young ruminants and young monogastrics.

When any of these factors irritates the intestine of a young mammal to a sufficient degree, the young mammal's body attempts to neutralize, isolate, destroy, and/or flush out the irritant using water. Indeed, the feces of a young mammal with scours may contain as much as five to ten times more water than the feces of a young mammal not suffering from scours. Loss of water that is employed in this fight against scours causes the young mammal to quickly become dehydrated and may cause the young mammal to die from dehydration, electrolyte loss, and/or increased blood acidity within just a few hours. At the very least, even if the young mammal recovers from scours, the growth rate of young mammals affected by scours typically decreases dramatically during, and for some time after, a scours outbreak. Consequently, dairy farmers and livestock producers alike are greatly interested in techniques for economically reducing the incidence of scours in young mammals.

Besides reducing the incidence of scours, dairy farmers and livestock producers are also greatly interested in techniques for economically achieving enhanced milk replacer consumption rates and enhanced rates of mammal weight gain, since such techniques eventually will have the effect, upon maturation of the young mammals, of beneficially reducing milk and meat (such as beef, pork, and lamb) production costs. Also, dairy farmers and livestock producers recognize that the care and feeding of livestock prior to weaning play an important role in determining the amount and quality of products produced by the mammals, upon maturation. As an example, the age of dairy cows at freshening and the onset of lactation may be reduced by modifying the nutrient mix and nutrient composition in feed the dairy cows consume and by inducing the cows to gain weight more quickly during the pre-weaning prior to freshening. Also, in cattle ranching operations, increasing the rate of weight gain by young ruminants beneficially reduces the time required for producing cattle with a size that is suitable for market.

Furthermore, in both dairy operations and livestock operations, it is generally desirable to increase the feed efficiency of young mammals. As used herein, the term "feed efficiency" refers to the ratio, over a select time period for one or more particular mammal(s), of (1) the weight gained by the mammal(s) versus (2) the weight of feed consumed by the mammals. As the ruminants more efficiently transform ingested feed into weight gain, the feed efficiency ratio, and consequently the feed efficiency, of the mammals increases, since less feed by the mammals is required to attain a unit amount of weight gain.

A major overall desire of dairy farmers and livestock producers alike is to reduce the overall cost to produce a product, such as milk or meat, with an acceptable level of quality. Depending upon numerous cost variables, such as the cost of feed, labor costs on the farm or ranch, and equipment and building costs on the farm or ranch, this desired cost reduction may be achieved by increasing the rate of weight gain by young mammals and/or increasing the feed efficiency of young mammals, while also reducing the incidence of health issues, such as scours and respiratory distress. Thus, dairy farmers and livestock producers, depending upon their particular cost variables, may employ improved mammalian health along with either enhanced rates of weight gain or increased feed efficiency or a combination of enhanced rates of weight gain and increased feed efficiency to reduce the cost of bringing milk and meat to the consumer market.

To complement liquid feeds fed to ruminants, such as cattle, prior to weaning, a number of additives and supplements have been developed for feeding calves along with the liquid feed during the pre-weaning period. These additives and supplements have been developed for a number of different purposes. For example, some additives and supplements have been developed to generally enhance the health of the young calves or help prevent or control development of specific conditions or ailments, such as scours. Additionally, some additives or supplements have been developed in an attempt to enhance appetite, enhance maturation rate, and/or enhance weight gain.

In this regard, various veterinary pharmaceutical compositions have been developed to help prevent or inhibit development of certain ailments in mammals, such as ruminants and monogastrics. Also, numerous vitamin compositions have been developed to help enhance the general health of mammals, such as ruminants and monogastrics, and/or to help prevent or inhibit development of ailments or conditions in mammals, such as ruminants and monogastrics. Additionally, some types of fiber have been prescribed for reducing scours in calves, and a Plantago seed supplement has been described to help reduce animal stress conditions, prevent or treat scours, and promote growth of some mammals. Also, some fiber supplements have been described for increasing the rate of weight gain per unit weight of protein consumed by some mammals.

Though the various mammalian feed supplements and additives that have been proposed and/or practiced over the years have enhanced the overall knowledge base with respect to mammalian feeding, these feed supplements and additives, as well as feeding techniques that employ these feed supplements and additives, have not yet fully identified, addressed, or optimized options for maintaining mammalian health; increasing weight gain rates by mammals, such as ruminants and monogastrics; or increasing the feed efficiency of mammals, such as ruminants and monogastrics. Thus, dairy farmers and livestock producers alike are still in need of new and better approaches to feeding mammals, such as ruminants and monogastrics, that maintain the health of, increase weight gain rates by, and/or increase the feed efficiency of mammals, such as ruminants and monogastrics. The method of the present invention achieves reduced scours incidence, reduced respiratory distress, enhanced weight gain rates and increased feed efficiencies in young mammals, such as young ruminants and monogastrics, and thereby satisfies this need of dairy farmers and livestock producers.

SUMMARY OF THE INVENTION

The present invention includes a food composition and an animal feed composition that each have an enhanced dietary fiber content, characterized in that the dietary fiber is derived from a (1) resistant starch which contains resistant starch.

It has now been found that resistant starch helps reduce the incidence of scours in young mammals, such as young ruminants and monogastrics, and also helps enhance milk replacer consumption rates and rates of weight gain by young mammals, such as young ruminants and monogastrics. The method of the present invention achieves reduced scours incidence, reduced respiratory distress, enhanced weight gain rates, and increased feed efficiencies in young mammals, such as young ruminants, and thereby satisfies a previously unmet need of dairy farmers and livestock producers. Such techniques eventually will have the effect, upon maturation of young mammals, such as young ruminants and monogastrics, of beneficially reducing milk and meat production costs.

Furthermore, the present invention relates to a method of feeding mammals, such as ruminants and monogastrics, an animal feed that contains resistant starch. For example, the present invention includes a method of increasing the feed efficiency of a young mammal, such as a young ruminant, during a feeding period that entails feeding the young mammal an effective amount of a fluid animal feed during the feeding period, and feeding the young mammal an effective amount of resistant starch during the feeding period. The present invention also includes a method of increasing the amount of weight gained by a young mammal, such as a young ruminant or monogastric, during a feeding period, a method of increasing the amount of milk replacer consumed by the mammal during a feeding period, a method of decreasing the amount of scours of the mammal during a feeding period, a method of decreasing the amount of respiratory distress of the mammal during a feeding period, and a method of feeding the mammal. The present invention further includes animal feed compositions, including but not limited to, a mammal ration, such as a ruminant or monogastric ration, and a daily mammal ration, such as a daily ruminant or monogastric ration.

Another embodiment of the present invention relates to a method of increasing the feed efficiency of a mammal during a feeding period, the method comprising: feeding the mammal an effective amount of a fluid animal feed during the feeding period; and feeding the mammal an effective amount of resistant starch during the feeding period, where the mammal may be, for example, a ruminant, such as a calf, or a monogastric, such as a pig.

Another embodiment of the present invention relates to a method of increasing the amount of weight gained by a mammal during a feeding period, the method comprising: feeding the mammal an effective amount of a fluid animal feed during the feeding period; and feeding the mammal an effective amount of resistant starch during the feeding period, where the mammal may be, for example, a ruminant, such as a calf, or a monogastric, such as a pig.

Another embodiment of the present invention relates to a method of increasing the amount of milk replacer consumed by a mammal during a feeding period, the method comprising: feeding the mammal an effective amount of a fluid animal feed during-the feeding period, the fluid animal feed comprising the milk replacer; and feeding the mammal an effective amount of resistant starch during the feeding period, where the mammal may be, for example, a ruminant, such as a calf, or a monogastric, such as a pig.

Another embodiment of the present invention relates to a method of decreasing the amount of scour of a mammal during a feeding period, the method comprising: feeding the mammal an effective amount of a fluid animal feed during the feeding period; and feeding the mammal ruminant an effective amount of resistant starch during the feeding period, where the mammal maybe, for example, a ruminant, such as a calf, or a monogastric, such as a pig.

Another embodiment of the present invention relates to a method of decreasing the amount of respiratory distress of a mammal during a feeding period, the method comprising: feeding the mammal an effective amount of a fluid animal feed during the feeding period; and feeding the mammal an effective amount of resistant starch during the feeding period, where the mammal maybe, for example, a ruminant, such as a calf, or a monogastric, such as a pig. Another embodiment of the present invention relates to a method of feeding a mammal the method comprising: providing the mammal with a fluid animal feed during a feeding period, the fluid animal feed comprising an animal feed component and the mammal provided with more than about 1.25 pounds of the animal feed component per day, based on the dry weight of the animal feed component, during the feeding period; and providing resistant starch to the mammal during the feeding period, where the first mammal may be, for example, a ruminant, such as a calf.

Another embodiment of the present invention relates to a mammal ration, a first diet comprising the mammal ration, where the mammal ration comprises: an effective amount of a fluid animal feed; and an effective amount of resistant starch, the mammal ration effective to improve the health of the mammal as determined by a member selected from the group consisting of: increasing the feed efficiency of a first mammal on the first diet during a feeding period, as compared to the feed efficiency of a second mammal on a second diet during the feeding period; increasing the amount of weight gained by a first mammal on the first diet during a feeding period, as compared to the amount of weight gained by a second mammal on the second diet during the feeding period; increasing the amount of milk replacer consumed by a mammal on the first diet during a feeding period, as compared to the amount of milk replacer consumed by a second mammal on the second diet during the feeding period; decreasing scour in a mammal on the first diet during a feeding period, as compared to scour in a second mammal on the second diet during the feeding period; decreasing respiratory distress in a mammal on the first diet during a feeding period as compared to the feed efficiency of a second mammal on the second diet during the feeding period; and combinations thereof; where the first diet and the second diet are identical except the second diet is free of the resistant starch; the first mammal may be, for example, a first ruminant, such as a first calf, or a first monogastric, such as a first pig; the second mammal may be, for example, a second ruminant, such as a second calf, or a second monogastric, such as a second pig; and the mammal ration may be a ruminant or monogastric ration.

Another embodiment of the present invention relates to a daily mammal ration during a feeding period, the daily mammal ration comprising: resistant starch; and an animal feed component, the amount of the animal feed component present in the daily mammal ration being preferably greater than about 1.25 pounds, on a dry matter basis, during the feeding period, where the daily mammal ration may be, for example, a daily ruminant ration.

Another embodiment of the present invention relates to a method of feeding mammals comprising the step of feeding said mammal a feed composition having an enhanced dietary fiber content comprising a feed and a feed ingredient, said feed ingredient comprising substantially chemically unmodified starch granules from a plant, grain, or parts thereof. Preferably, said starch granules comprise at least about 0.05% w/w of resistant starch, said starch granules providing a sufficient resistant starch so as to yield an enhanced dietary fiber content in the feed composition of about 0.05% w/w or more, where the mammal may be, for example, a ruminant or a monogastric. More preferably, said starch granules comprise at least about 15% or more, more preferably 20% or more, more preferably 40% or more, more preferably 60% or more, and more preferably 70% w/w or more of resistant starch.

BRIEF DESCRIPTION OF THE DRAWING

The FIGURE is a graph of total dietary fiber versus amylose content for various samples representing three maize varieties-regular maize, waxy maize and high amylose maize.

DISCLOSURE OF INVENTION

Figure 1:
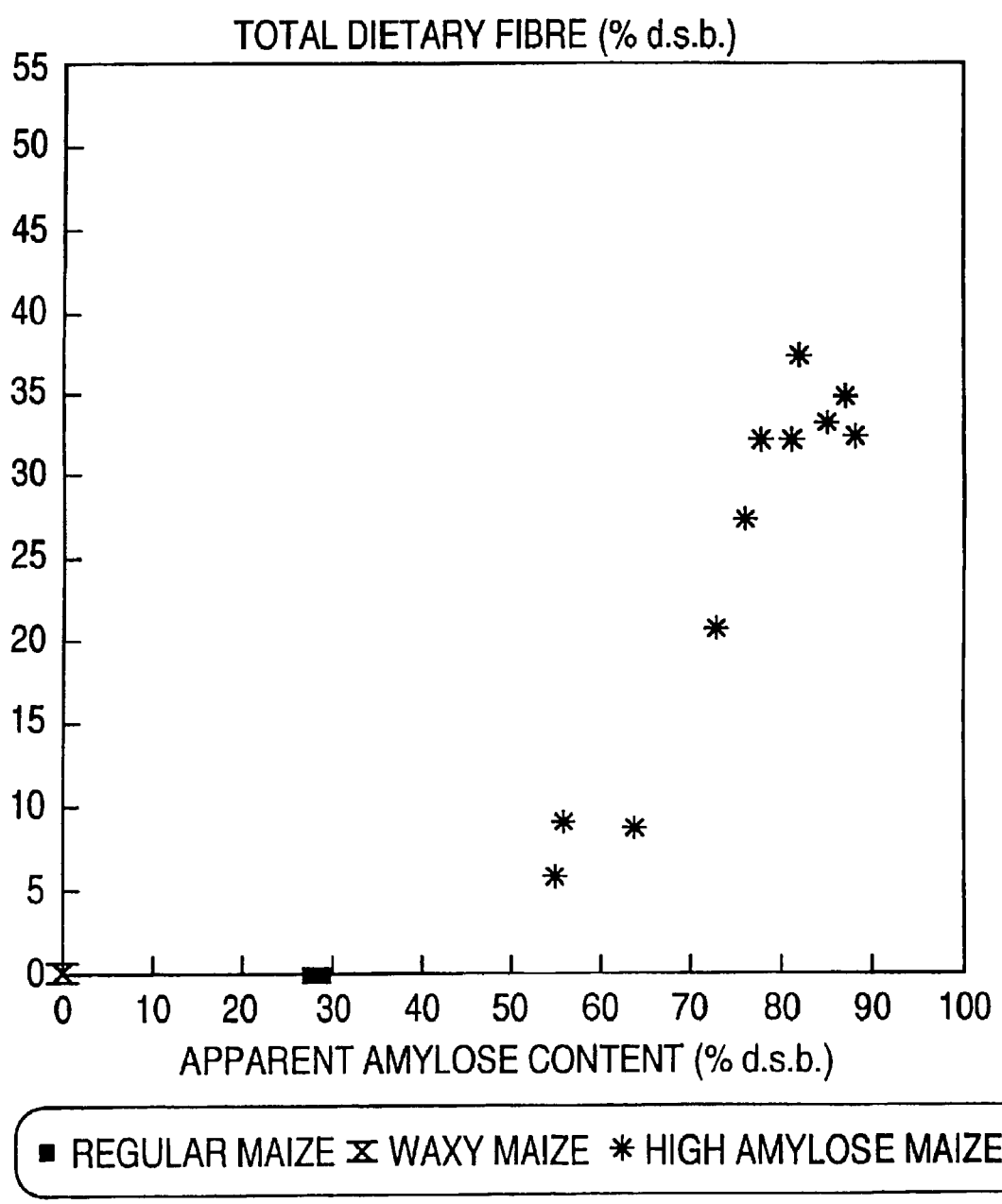

As used herein, "high amylose" means an amylose content on a dry solids basis (dsb) of 50% (w/w) or more, more preferably 60% (w/w) or more, more preferably 70% (w/w) or more, and more preferably 80% (w/w) or more. Particularly preferred amylose contents on a dry solids basis are 85% (w/w) or more and 90% (w/w) or more. For a rice starch, as used herein, an amylose content on a dry solids basis of 27% (w/w) or more is considered to be a "high amylose starch". Note that the method used to determine amylose content is that described in International Patent Application No. PCT/AU93/00389, that correspond to U.S. Pat. No. 5,714,600; the entire contents of U.S. Pat. No. 5,714,600 are incorporated herein by way of reference.

The resistant starch that is utilized in the present invention is believed to function like dietary fiber. Resistant starches are starches that are highly resistant to hydration and the effects of digestive enzymes. Resistant starches, when ingested by mammals, are not digested or absorbed by organs of the gastrointestinal tract, to at least a predominant extent, as the resistant starch(es) passes (pass) through the upper regions of the gastrointestinal tract. In ruminants, the phrase "upper regions of the gastrointestinal tract" refers to the rumen, reticulum, omasum, and abomasum, which are briefly described later in this document. As used herein, the term "resistant starch" is defined as "the sum of starch and products of starch degradation not absorbed in the small intestine of healthy individuals" (Euresta Newsletter 11.1 (1991). Besides resistant starch (also referred to as "RS" herein), classifications for other types of starch include rapidly digestible starch ("RDS") and slowly digestible starch ("SDS"). Unlike the resistant starch that is utilized in the present invention, rapidly digestible starch and slowly digestible starch are less resistant or even non-resistant to hydration and the effects of digestive enzymes and, when ingested by mammals, are significantly or even substantially digested and/or absorbed by organs of the upper gastrointestinal tract, as the rapidly digestible starch or slowly digestible starch passes through the upper regions of the gastrointestinal tract.

Those of ordinary skill in the art generally classify resistant starch into one of the following four different classifications: RS1, RS2, RS3, or RS4 as defined in Brown, McNaught and Moloney (1995) Food Australia 47: 272-275. All resistant starch, such as the RS1, RS2, RS3, or RS4, resistant starches may be employed as the resistant starch that is utilized in the present invention.

RS1 refers to starch that is physically inaccessible that is locked within cell walls of botanical substances and therefore qualifies as resistant starch. The RS1 type of resistant starch is, for example, found in partially milled grains, seeds, and legumes. RS2 refers to native resistant starch which are a component of starch granules such as those found in bananas (especially green bananas) and raw potatoes. Bananas and raw potatoes have relatively low gelatinization temperatures typically on the order of about 60° C. to about 80° C. that present substantial problems to formulating satisfactory food products; therefore, while acceptable sources of the resistant starch utilized in the present invention, bananas and raw potatoes are not preferred sources of the resistant starch utilized in the present invention. Intragranular polymeric rearrangements that lead to an increased granular resistance to amylase digestion are also included in this category. This increased resistance could be the result of heat and/or moisture treatments or annealing of the intact granule.

Next, RS3 refers to retrograded non-granular starch or crystalline non-granular starch, such as starch found in cooked and cooled potatoes, bread crusts, and cereals (cornflakes, for example) and starch pastes that have been extensively processed (by repeated cooking and cooling). Finally, RS4 refers to specific starches that have been chemically modified and/or re-polymerized (which may include molecular weight reduction), such as ethers, esters, and crossbonded starches, as well as chain linkage altered dextrins, pyrodextrins, and maltodextrins.

Again, the resistant starch that is utilized in the present invention may be any resistant starch, such as any of the RS1, RS2, RS3, or RS4 resistant starches or any combination of any different resistant starches. Preferably, the resistant starch that is utilized in the present invention is high amylose starch.

Any high amylose starch that is utilized in the present invention is preferably a maize starch. The maize starch is preferably derived from any single maize hybrid, any double maize hybrid, or any multiple cross maize hybrid, with a maize single cross F1 hybrid that is capable of producing maize having a high amylose content being particularly preferred. Some suitable, though non-exhaustive, examples of high amylose starch are the HI-MAIZE® high amylose starches available from Penford Australia Limited of Lane Cove, New South Wales, Australia. HI-MAIZE® 1043 starch is one particularly preferred high amylose starch for use in the present invention.

While maize starch is preferred as the resistant starch, any other resistant starch may be utilized to achieve benefits of the present invention. For example, resistant waxy maize (corn) starch; resistant regular or normal maize (corn) starch; resistant wheat starch; resistant rice starch; resistant legume, pea or pulse starch; resistant barley starch; resistant triticale starch; resistant sorghum starch; resistant milo starch; resistant cassaya starch; resistant oat starch; resistant potato starch; resistant tapioca starch; and resistant sago starch are some other non-exhaustive examples of resistant starch that maybe utilized in the present invention.

The resistant nature of the starches of this invention are not fully understood. Nonetheless, while not being bound by theory, it is suspected that the conformation and architecture of the starch granule and the molecular arrangement of the glucan polymers, including crystalline structures, and the association of these polymers with other substances, including free fatty acids, may be responsible for imparting the resistant characteristic.

The resistant starch will typically be, and preferably is, in the form of a powder that is preferably free flowing to help maintain particles of the resistant starch in solution if combined with water. The resistant starch is preferably ground to allow it to pass through various Bureau of Standards Sieves from the U.S. Standard Sieve Series. The sieving profile may easily be changed depending on the grinding mill and screen size used to break up the agglomerates formed during drying of the starch. The average particle size of high amylose grain starch is generally less than about 14 microns, as measured using the method detailed below. The average particle size of waxy or regular maize starch granules is generally greater than about 14 microns. For example, HI-MAIZE® 1043 starch has a powdery particle size distribution, with a maximum of one weight percent of the particles being about 112 microns or larger.

Starch granules from any botanical source are a heterogeneous mixture varying in physiological age. This variation in physiological age affects the physical size, structure and properties of different starch granules. A number of authors have noted property variations between different starch size fractions if the starch granules are physically separated according to their granule size. For example, Cluskey et al. "Fractionation and Characterization in Dent Corn and Amylomaize Starch Granules" in Starke, 32 (4.S.) 105-109 (1980) reported on the fractionation of dent corn and amylomaize starch granules. Cluskey et al. discovered an inverse relationship between granule size and iodine binding capacity (indicative of amylose content) in the amylomaizes starch granules: the apparent amylose found in the fractions of amylose V starch that Cluskey et al. studied amounted to 40 weight percent amylose for the fraction with the largest particle sizes and 52 weight percent amylose for the fraction with the smallest particle sizes.

Cluskey et al. first fractionated a high amylose maize starch—High Amylose 80(10/91)—into seven subsamples based on granule size using the aqueous differential sedimentation procedure described by Cluskey et al. (1980), supra. This method was chosen to minimize the potential for damaging the starch granules since the procedure indicates that exposure of starch granules to distilled water for long periods of time does not affect the integrity of the starch granules and does not introduce any residues into the starch fraction samples. Each starch sample (60 grams) was separated into the seven fractions. Each of the seven fractions of each starch sample were then freeze-dried and weighed on a Mettler PE 3600 top pan balance. A scanning electron microscope was used to visually confirm that each starch sample fraction had a uniform distribution of different size granules.

Each of the different starch sample fractions were analyzed for granule size according to the particle size analysis method described in the Property Determination & Characterization Techniques section of this document. The apparent amylose concentration of each of the different starch sample fractions was also determined using the amylose content determination procedure described in the Property Determination & Characterization Techniques section of this document. The dietary fiber content of the different starch sample fractions was determined using the methods disclosed in co-pending Australian patent application PL6537.

As seen in Table 1 below, the level of resistant starch for the high amylose starches, particularly high amylose 80, is substantially greater than regular maize starch.

TABLE 1

Total Dietary Fiber and Resistant Starch Levels in Different Maize Starches

| Sample Description | Total Insoluble Dietary Fiber (% dsb) | Resistant Starch By Method # 1 (% dsb) | By Method # 2 (% dsb) |
|---|---|---|---|
| Waxy Maize Starch (8/91) | <0.2 | 0.7 " 0.5 | 5.8 |
| Regular Maize Starch (7/91) | <0.2 | 1.3 " 0.9 | −0.4 |
| High Amylose 50 Starch (7/91) | 8.0 | 8.2 " 0.4 | 7.5 |
| High Amylose 80 Starch (7/91) | 21.2 | Not Determined | 11.9 |
| High Amylose 80 Starch (10/91) | 31.8 | 20.0 " 1.8 | 18.1 |

RS Determination Method # 1: Muir et al, Measurement of Resistant Starch Factors Affecting Starch Escaping Digestion In Vitro, @ Am. J. Clin. Nutr. vol 56, pp 123–127 (1992).
RS Determination Method # 2: McClearly et al, A Rapid Procedure for Total Starch Measurement in Cereal Grains and Products, @ pp 304–312, Proc. 42$^{nd}$ RACI Cereal Chem. Conf., Christchurch, NZ, Ed. V J Humphrey-Taylor (1992).

From Table 1, it is evident the resistant starch content of the three different high amylose starches is substantially greater than the resistant starch content of both the waxy maize starch and the regular maize starch. Indeed, the resistant starch content of the High Amylose 80 starch is particularly high, compared to the resistant starch contents of both the waxy maize starch and the regular maize starch.

The FIGURE shows a graph of total dietary fiber versus amylose content for a variety of samples representing three different maize varieties: regular maize, waxy maize and high amylose maize. From this FIGURE, it is evident that all of the regular maize and waxy maize samples contained substantially no dietary fiber, whereas all of the high amylose maize samples had a measurable dietary fiber content. The regular maize samples depicted in the FIGURE were found to have an amylose content of about 28 weigh percent, while the amylose content of the waxy maize depicted in the FIGURE was nil. The finding that amylose content and fiber content are related to each other in a direct ratio is surprising. Consequently, both the finding that an amylose content greater than about 50 weight percent in starch is associated with significant dietary fiber content is somewhat surprising and the substantial dietary fiber content increases relative to increasing amylose content increases are likewise surprising, both in the context of the data presented in the FIGURE and in Table 1.

While maize starch is preferred as the resistant starch and the dietary fiber and resistant starch results shown respectively in the FIGURE and in Table 1 are directed to maize starch, it should be appreciated that this invention is broad and resistant starches besides resistant maize starch may serve as the resistant starch of the present invention. For example, resistant wheat, resistant rice, resistant pea and other resistant pulses, resistant barley, resistant triticale, resistant sorghum, resistant milo, resistant cassaya, resistant oats, resistant potato, resistant tapioca, and resistant sago starch may also be utilized as resistant starches in the compositions of the present invention. Furthermore, any resistant starch that has been physically modified or chemically modified to produce a derivative and any resistant starch created by physical modification or chemical modification of botanical material may be utilized in the present invention.

Besides the resistant starch, any starch other than resistant starch, such as any rapidly digestible starch ("RDS") and/or any slowly digestible starch ("SDS"), may be employed in any combination with the resistant starch in the present invention. As used herein, "rapidly digestible starches" are defined as starches that have been cooked to ensure full granule disruption (but not allowed to form any resistant material). Most raw granular starches are slowly but fully digested. Preferably, when a starch other than resistant starch is employed in combination with the resistant starch, only rapidly digestible starch is employed in combination with the resistant starch. Exemplary rapidly digestible starches include rapidly digestible waxy maize (corn) starch, rapidly digestible regular or normal maize (corn) starch, rapidly digestible wheat starch, rapidly digestible rice starch, rapidly digestible pea and other pulse starch, rapidly digestible barley starch, rapidly digestible triticale starch, rapidly digestible oat starch, rapidly digestible potato starch, rapidly digestible tapioca starch, rapidly digestible sago starch, and the like. When a rapidly digestible starch is employed in combination with the resistant starch, approximately the same weights of resistant starch and rapidly digestible starch are preferably used.

Suitable rapidly digestible regular maize (corn) starch for use in combination with the resistant starch may be obtained from many sources, such as A. E. Staley Manufacturing Company of Decatur, Ill. STADEX® starch that may be obtained from A. E. Staley Manufacturing Company of Decatur, Ill. Suitable is an example of rapidly digestible regular maize (corn) starch that may be suitably used in combination with the resistant starch in accordance with the present invention. The rapidly digestible regular maize (corn) starch should be suitable for feeding to ruminants and may generally have any particle size range and any average particle size. The rapidly digestible regular maize (corn) starch, such as the STADEX® starch, preferably has a particle size range of about 5 microns to about 25 microns and preferably has an average particle size of about 13.9 microns.

The resistant starch of the invention may be incorporated into a wide range of food products that are intended solely for human consumption. A non-exhaustive list of such products include: pasta; noodles; instant noodles; breakfast cereals; baked goods such as bread, biscuits, crackers and the like; snack foods; cheese and other dairy based products, confectionery; beverages, including but not limited to fruit juice such as orange juice; yogurt, including but not limited to drinking and spoonable yogurts; health supplements; pharmaceuticals; and the like.

Incorporation of the resistant starch of the invention into food products will be at a level consistent with the required level of dietary fiber in the finished food product. A broadly useful level of incorporation generally lies in the range of from about 0.25-99.75% (w/w), based on the total weight of the finished food product. It will be appreciated that in some food products, resistant starch containing whole grain or flour, semolina, polenta, or grits derived from the grain may be incorporated alone or in combination with non-resistant starch. Furthermore, the resistant starch of the invention may be used as a partial replacement for the flour incorporated in food products, such as bread.

Other starches, hydrocolloids, or dietary fibers may also be utilized in the food compositions of this invention that are intended for human consumption. Other starches and starch containing materials, include but are not limited to, plant components, such as, grain, tuber, seeds, and the like, which may be physically, enzymatically or chemically modified, such as through the processes of dextrinisation or dry roasting in the presence or absence of a catalyst such as hydrochloric, nitric, sulfuric acid, and the like. Other hydrocolloids, include but are not limited to gums, such as guar, xanthan, locus bean, carageenan, pectin, and gellan; cellulose and cellulose derivatives, such as carboxy methylcellulose, microcrystalline cellulose; and the like. Other dietary fibers, include but are not limited to, psyllium; inulin; oligosaccharides, such as fructo-, galacto-, malto-, isomalto-, gentio-, agaro, neoagaro-, α-gluco-, β-gluco-, cyclo-, inulo-, glycosyl sucrose, latulose, lactosucrose, or xylosucrose; bran, pericarp, endosperm, or cell wall material from cereals such as wheat, triticale, sorghum, milo, rice, sago, potato, tapioca, cassaya, oats, barley, and corn, or pulses, such as peas and lupins, and the like, which may be further processed or modified, such as by bleaching, and the like.

Any starch or material containing starch as a component, such as flour, semolina, grits, polenta, and the like, employed in combination with the resistant starch in food compositions intended for human consumption is preferably in powdered form. All particle size details and particle size distribution details provided herein with regard to resistant starch are equally applicable to any starch other than resistant starch that is employed in combination with the resistant starch in food compositions intended for human consumption. All details provided herein about how the resistant starch is provided in food compositions intended for human consumption are equally applicable to any starch beyond resistant starch that is employed in combination with the resistant starch in food compositions intended for human consumption.

In addition to food compositions intended for human consumption, the present invention also encompasses animal feeds and methods of feeding animals, such as ruminants and monogastrics. For example, one method of the present invention relates to feeding mammals, such as ruminants and monogastrics, especially prior to weaning, an animal feed that contains resistant starch. This method includes feeding young mammals, such as young ruminants and young monogastrics, according to a feeding regimen prior to weaning during a "pre-weaning period." During the pre-weaning period, the mammals are fed a fluid animal feed along with resistant starch. The resistant starch may be supplied separately from the fluid animal feed, but is preferably supplied to the young mammals as part of the fluid animal feed. In addition, during the pre-weaning period, the young mammals have free access to water ad libitum.

Weaning occurs when the liquid feed is withdrawn from the diet of the young mammals, such as young ruminants or young monogastrics. Thus, as used herein, the term "pre-weaning period" refers to the period when nutrients are predominantly or entirely supplied to the young mammal, such as the young ruminant (for example, a calf) or young monogastric (for example, a pig), in liquid form, as part of a liquid feed, and the term "post-weaning period" refers to the period when nutrients are no longer predominantly or entirely provided to the mammal, such as the calf or pig, in the form of liquid feed. In ruminants, the post-weaning period is sometimes also referred to as the "ruminant period."

The fluid animal feed that is provided during the pre-weaning period may generally include any fluid milk replacer that provides a level of nutrition to mammals, such as ruminants or monogastrics, sufficient to support the nutritional requirements of the mammal during the pre-weaning period. The fluid milk replacer may be liquid milk replacer, rehydrated milk replacer that is formed by rehydrating dry, (such as powdered, pelleted, or granular) milk replacer, or a combination of liquid milk replacer and rehydrated milk replacer. As used herein, the term "liquid milk replacer" refers to milk replacer that is in liquid form when purchased. Often, if not predominantly, liquid milk replacer is based upon dry, milk replacer that has been rehydrated. As used herein, the term "rehydrated milk replacer" refers to milk replacer that is prepared as a liquid, after purchase or preparation of the dry, (such as powdered, pelleted, or granular) milk replacer, by rehydrating the dry, milk replacer.

The resistant starch (and any material other than resistant starch that is employed in combination with resistant starch, such as other starches, hydrocolloids, gums, and/or fibers) is preferably provided to the mammals, such as ruminants, as part of the fluid animal feed, though the resistant starch (and any material other than resistant starch that is employed in combination with resistant starch) may optionally be provided separately from the fluid animal feed. Surprisingly, it has been discovered that ingestion of resistant starch (and any material other than resistant starch that is employed in combination with resistant starch) by young mammals, such as young ruminants or young monogastrics, in accordance with the present invention helps control scours and enhances the respiratory health of the young mammals. Nonetheless, the fluid animal feed may, and preferably does, include antibiotics to further help control scours and further enhance the respiratory health of the young mammals. Some non-exhaustive examples of desirable antibiotics include Neomycin and Oxytetracycline, which are preferably provided in the fluid animal feed in combination with each other. Beneficially, however, the surprising ability of resistant starch (and any material other than resistant starch that is employed in combination with resistant starch) to help control scours and enhance the respiratory health of young mammals, such as young ruminants or young monogastrics, reduces the amount of relatively expensive antibiotics needed to maintain scours incidence and respiratory health at an acceptable level.

The fluid animal feed may optionally also include any other nutritional component that is capable of remaining dissolved or in suspension in the fluid animal feed. Some non-exhaustive examples of other nutritional components that are typically capable of remaining dissolved or in suspension in the fluid animal feed and that may therefore typically be incorporated as part of the fluid animal feed include vitamins, such as vitamin A, vitamin D, and/or vitamin E; trace minerals, such as calcium, phosphorous, and or magnesium; sugar(s); sugar solution(s); sugar alcohol(s); protein material(s), such as vegetable protein material(s), animal protein material(s), and marine protein material(s); bean-based or grain-based oil(s); bean-based or grain-based meal(s); bean-based or grain-based syrup(s); fatty acid(s); and any of these in any combination. Preferably, however, the fluid animal feed primarily consists of, and more preferably consists essentially of, the fluid milk replacer, any optionally added antibiotics, and the resistant starch (and any starch(es), hydrocolloid(s), or dietary fiber(s) other than resistant starch that are employed in combination with resistant starch).

The fluid milk replacer, when purchased as liquid milk replacer, may generally be any commercially available liquid milk replacer. The fluid milk replacer, when prepared from dry milk replacer, may be formulated and prepared as the rehydrated milk replacer by those responsible for feeding the mammals, such as the ruminants or monogastrics. Some examples of suitable dry, (such as powdered, pelleted, or granular) milk replacers for forming the rehydrated milk replacer include AMPLIFIER® MAX NT powdered milk replacer, AMPLIFIER® Select NT powdered milk replacer, MAXI CARE® NT powdered milk replacer, and Nursing Formula® NT powdered milk replacer that are each available from Land O'Lakes, Inc. of Arden Hills, Minn.

The fluid milk replacer may generally include any concentration of crude protein. However, for young ruminants, the fluid milk replacer preferably contains about 16 to about 35 weight percent crude protein, based on the total dry weight of the fluid milk replacer, to help optimize weight gain in the young ruminants. More preferably, for young ruminants, the fluid milk replacer contains about 20 to about 30 weight percent crude protein, based on the total dry weight of the fluid milk replacer. Likewise, the fluid milk replacer may contain any concentration of fat, but for ruminants preferably contains about 5 to about 30 weight percent fat, based on the total dry weight of the fluid milk replacer, to increase the energy content of the fluid milk replacer, help reduce the incidence of scours in the young ruminants, and inhibit deleterious effects of any stress the young ruminants experience. More preferably, for young ruminants, the fluid milk replacer contains about 15 to about 20 weight percent fat, based on the total dry weight of the fluid milk replacer.

Some examples of preferred fat sources for the fluid milk replacer are edible lard and high quality vegetable fats that may be used individually or in any combination. The fat in the fluid milk replacer is preferably homogenized to reduce the particle size of the fat and enhance the digestibility of the fat. One preferred form of the fluid milk replacer for ruminants includes about 22 weight percent crude protein and about 20 weight percent fat, based on the total dry weight of the fluid milk replacer.

If dry (such as powdered, pelleted, or granular) milk replacer is used, the dry, milk replacer may be rehydrated with water or any edible aqueous fluid, such as fluid milk, to form the fluid milk replacer. The concentration of the dry, milk replacer in the water or aqueous fluid may be varied in any ratio, depending on the desired concentration of nutrients in the fluid milk replacer and the desired consistency of the fluid milk replacer. Preferably, however, the dry milk replacer is rehydrated in water to form fluid milk replacer having a total solids concentration ranging from about 10 weight percent to about 20 weight percent, based on the total weight of the fluid milk replacer. Of course, rehydrated milk replacer may also be combined with liquid milk replacer to form the fluid milk replacer. Likewise, dry (such as powdered, pelleted, or granular) milk replacer may be rehydrated by combining the dry, milk replacer with liquid milk replacer and, optionally, additional water and/or additional aqueous fluid.

The fluid animal feed may be prepared by combining the animal feed component, such as powdered or dry milk replacer, and, optionally any other nutritional component(s). Preferably, the resistant starch (and any starch other than resistant starch that is employed in combination with resistant starch) is also incorporated in the fluid animal feed. As used herein, the term "animal feed component" generally refers, collectively, to any and all milk replacer(s), such as dry (such as powdered, pelleted, or granular) milk replacer(s), fluid milk replacer(s), liquid milk replacer(s), and/or rehydrated milk replacer(s) incorporated in the fluid animal feed. The fluid animal feed should include an effective amount of the animal feed component. The term "effective amount of the animal feed component" is defined subsequently herein.

The resistant starch (and any material other than resistant starch that is employed in combination with resistant starch) that is employed in the present invention provides optimum results when preliminarily mixed with a dry form of the animal feed component, such as powdered or dry milk replacer. Thus, the resistant starch (and any material other than resistant starch that is employed in combination with resistant starch) is preferably incorporated in the fluid animal feed. Mixing the resistant starch (and any material other than resistant starch that is employed in combination with resistant starch) with a dry form of the animal feed component prior to addition of water simplifies distribution and use of the fluid animal feed. In particular, the mixture of the resistant starch (and any material other than resistant starch that is employed in combination with resistant starch) and the dry form of the animal feed component may be transported as a pre-mixed composition that is later combined with water (or an aqueous fluid) so the person supplying the fluid animal feed to the mammals, such as the ruminants or monogastrics, does not have to accurately mix the animal feed component and the resistant starch (and any material other than resistant starch that is employed in combination with resistant starch) prior to feeding the fluid animal feed to the mammals.

Shortly, before feeding the mammals (such as the ruminants or monogastrics) the fluid animal feed, the mixture of the resistant starch (and any material other than resistant starch that is employed in combination with resistant starch) and the dry form of the animal feed component may be mixed with any desired amount of water, such as an effective amount of water, to form the fluid animal feed. As used herein, the term "effective amount of water" means an amount of water that is sufficient to provide the fluid animal feed with a texture and consistency similar to the texture and consistency of fluid milk. Of course, besides water, the "effective amount of water" takes into account the water content of any aqueous fluid other than, or in addition to, water that is combined with the dry form of the animal feed component.

As used herein, the term "monogastrics" means an animal that has a single chamber stomach. Some non-exhaustive examples of monogastrics include, pigs, horses, cats and dogs.

As used herein, the term "ruminant" means an even-toed, hoofed animal that has a complex 3- or 4-chamber stomach and that typically re-chews what the ruminant has previously swallowed. Some non-exhaustive examples of ruminants include cattle, sheep, goats, oxen, musk, ox, llamas, alpacas, guanicos, deer, bison, antelopes, camels, and giraffes.

The digestive tract of a cow, one example of the ruminant that may be fed in accordance with the present invention, includes a stomach that has four different components: a rumen, a reticulum, an omasum, and an abomasum. The four sections of the stomach may affect digestion of a component passing through the stomach because each section of the stomach serves a different function in the digestive process.

In the rumen of a mature ruminant with a fully functional ruminant, food is mixed with the saliva and then churned in a coordinated motion. The food mixture undergoes some fermentation and bacterial digestion in the rumen. Also, portions of the food mixture that enter the rumen with an excessively large particle size are formed into a cud that the ruminant regurgitates and rechews to reduce the particle size. Properly sized food that leaves the rumen passes from the rumen through the reticulum and into the omasum. While in the omasum, the food mixture is mixed to maintain the food mixture in a homogenous state and to remove excess fluid. Then, the homogenous mixture is passed from the omasum to the abomasum where gastric digestion occurs.

During the pre-weaning period, under feeding regimens currently employed in the dairy industry, young ruminants are typically fed the animal feed component, such as the fluid milk replacer, at rates that extend up to about 1.25 pounds of the animal feed component, per day, based on the dry weight of the animal feed component. Consequently, any feeding rate ranging up to about 1.25 pounds of the animal feed component, such as the milk replacer, per day, based on the dry weight of the animal feed component, that occurs during at least part of the pre-weaning period falls within the meaning of the term "conventional feeding rate," as defined herein, for the animal feed component, such as the milk replacer, unless otherwise specified. Correspondingly, any feeding rate above about 1.25 pounds of the animal feed component, such as the milk replacer, per day, based on the dry weight of the animal feed component, during at least part of the pre-weaning period falls within the meaning of the term "enhanced feeding rate," as defined herein, for the animal feed component, such as the milk replacer, unless otherwise specified.

Preferably, the enhanced feeding rate for the animal feed component is at least about 1.5 pounds of the animal feed component, such as the milk replacer, per day, based on the dry weight of the animal feed component, during the pre-weaning period. More preferably, the enhanced feeding rate for the animal feed component is at least about 2.0 pounds of the animal feed component, such as the milk replacer, per day, based on the dry weight of the animal feed component, during the pre-weaning period. When employing the conventional feeding rate anytime during the pre-weaning period, the conventional feeding rate is preferably at least about 1.0 pounds of the animal feeding component.

The resistant starch that is provided to the young mammals, such as young ruminants, along with the animal feed component during the pre-weaning period may generally be provided at any effective amount of the resistant starch. As defined herein, "effective amount" of the resistant starch means an amount of the resistant starch that, when provided to, and consumed by, a young mammal (such as a young ruminant) during the pre-weaning period, in combination with the animal feed component, such as the milk replacer, or in combination with both the animal feed component and any starch other than resistant starch, is effective to increase the feed efficiency of the young mammal, increase the amount of weight gained by the mammal, increase the amount of milk replacer consumed by the mammal, decrease the amount of scour of the mammal, and/or decrease the amount of respiratory distress of the mammal during all or part of a feeding period, such as the pre-weaning period.

As one non-exhaustive example of the effective amount of the resistant starch, the weight ratio of the resistant starch to the animal feed component, such as the milk replacer, that is provided to the young mammal(s), such as the young ruminant(s), may range from about 0.1:100 to about 10:100, based upon the dry weight of the resistant starch and the dry weight of the animal feed component, during at least part, and preferably during all, of the pre-weaning period. Preferably, the weight ratio of the resistant starch to the animal feed component, such as the milk replacer, that is provided to the young mammal(s), such as the young ruminant(s), ranges from about 1:100 to about 7.5:100, based upon the dry weight of the resistant starch and the dry weight of the animal feed component, during at least part, and preferably during all, of the pre-weaning period.

More preferably, when providing resistant starch without providing any other starch, such as corn starch, the weight ratio of the resistant starch to the animal feed component, such as the milk replacer, that is provided to the young mammal(s), such as the young ruminant(s), ranges from about 3:100 to about 10:100, based upon the dry weight of the resistant starch and the dry weight of the animal feed component, during at least part, and preferably during all, of the pre-weaning period. Still more preferably, the weight ratio of the resistant starch to the animal feed component, such as the milk replacer, that is provided to the young mammal(s), such as the young ruminant(s), without providing any other starch, is about 5:100 to about 7:100, based upon the dry weight of the resistant starch and the dry weight of the animal feed component, during at least part, and preferably during all, of the pre-weaning period.

On the other hand, when starch, such as corn starch, other than resistant starch is provided in combination with the resistant starch, the weight ratio of the resistant starch to the animal feed component, such as the milk replacer, that is provided to the young mammal(s), such as the young ruminant(s), more preferably ranges from about 1:100 to about 4:100, based upon the dry weight of the resistant starch and the dry weight of the animal feed component, and the weight ratio of the starch (such as corn starch) other than resistant starch to the animal feed component, such as the milk replacer, that is provided to the young mammal(s), such as the young ruminant(s), ranges from about 1:100 to about 4:100, based upon the dry weight of the starch and the dry weight of the animal feed component during at least part, and preferably during all, of the pre-weaning period.

Still more preferably, when starch other than resistant is provided in combination with the resistant starch, the weight ratio of the resistant starch to the animal feed component, such as the milk replacer, that is provided to the young mammal(s), such as the young ruminant(s), is about 2.5:100, based upon the dry weight of the resistant starch and the dry weight of the animal feed component, and the weight ratio of the starch (such as corn starch) other than resistant starch to the animal feed component, such as the milk replacer, that is provided to the young mammal(s), such as the young ruminant(s), is about 2.5:100, based upon the dry weight of the starch other than resistant starch and the dry weight of the animal feed component during at least part, and preferably during all, of the pre-weaning period.

For purposes of considering comparisons between different young mammal(s), such as comparisons between different young ruminant(s), that are fed in different ways, the "effective amount of the resistant starch" maybe characterized as a "first effective amount of the resistant starch" or as a "second effective amount of the resistant starch," depending upon the particular comparison under consideration. Both the "first effective amount of the resistant starch" and the "second effective amount of the resistant starch" fall within the scope of the "effective amount of the resistant starch."

The first effective amount of the resistant starch may be considered in a comparison of a first mammal, such as a first ruminant, with a second mammal, such as a second ruminant, where the first mammal is fed the first effective amount of the resistant starch in combination with the "effective amount of the animal feed component," but where the first mammal is not fed any starch other than resistant starch. When used in combination with the first effective amount of the resistant starch, the "effective amount of the animal feed component" is the amount of the animal feed component that is fed to the first mammal during the time period when the resistant starch is fed to the first mammal. When the effective amount of the animal feed component is used in combination with the first effective amount of the resistant starch, the animal feed component and the resistant starch are preferably fed to the first mammal together as part of the fluid animal feed.

When used in combination with the first effective amount of the resistant starch, the animal feed component is preferably fed to the first ruminant at the enhanced feeding rate (above about 1.25 pounds of the animal feed component per day, based on the dry weight of the animal feed component) for the animal feed component for most, if not all, of the feeding period. Nevertheless, when provided along with the first effective amount of the resistant starch, it is believed the effective amount of the animal feed component may permissibly be about 1.25 pounds, or less, of the animal feed component per ruminant (per calf, for example) per day for a substantial amount, most, or even all of the feeding period, while still realizing benefits in accordance with the present invention.

Taking these considerations into account, the "first effective amount of the resistant starch," as used herein, means an amount of the resistant starch that, when fed during the pre-weaning period along with the effective amount of the animal feed component to the first mammal, such as the first ruminant:

(1) that is provided an equal amount of the same, or substantially the same, animal feed component as the second mammal (such as the second ruminant), where the animal feed component is provided at an equal rate to both the first mammal and the second mammal, (2) while the first mammal is provided with the first effective amount of the resistant starch and the second mammal is provided with a starch, such as corn starch, other than resistant starch, with the weight of the starch other than resistant starch provided to the second mammal being equal to the weight of the resistant starch provided to the first mammal, and (3) while the first mammal and the second mammal also have equal access to water ad libitum, is effective to cause at least one, preferably at least two, more preferably at least three, still more preferably at least four, even more preferably at least five, and most preferably all six of the following improvements that are listed in (a), (b), (c), (d), (e), and (f) below:

(a) an increase in the feed efficiency of the first mammal versus the feed efficiency of the second mammal, as measured over a segment of the pre-weaning period, preferably over a four week segment of the pre-weaning period, and more preferably over the entire pre-weaning period, (b) a larger amount of weight gain by the first mammal versus the amount of weight gain by the second mammal as measured over a segment of the pre-weaning period, preferably over a one week segment of the pre-weaning period, more preferably over a four week segment of the pre-weaning period, and still more preferably over the entire pre-weaning period, (c) a larger amount of animal feed component consumption by the first mammal versus the amount of animal feed component consumption by the second mammal over a segment of the pre-weaning period, preferably over a one week segment of the pre-weaning period, more preferably over a four week segment of the pre-weaning period, and still more preferably over the entire pre-weaning period, (d) a decreased scour score by the first mammal versus the scour score of the second mammal over a segment of the pre-weaning period, preferably over a one week segment of the pre-weaning period, more preferably over a two week segment of the pre-weaning period, still more preferably over a four week segment of the pre-weaning period, and even more preferably over the entire pre-weaning period, (e) a decrease in the number of days where the scour score of the first mammal is greater than one versus the number of days where the scour score of the second mammal is greater than one, as measured over a segment of the pre-weaning period, preferably over a one and/or two week segment of the pre-weaning period, more preferably over a four week segment of the pre-weaning period, and still more preferably over the entire pre-weaning period, and/or (f) a decrease in the number of days where the respiratory score of the first mammal is one versus the number of days where the respiratory score of the second mammal is one, as measured over a segment of the pre-weaning period, preferably over a one week segment of the pre-weaning period, more preferably over a four week segment of the pre-weaning period, and still more preferably over the entire pre-weaning period.

The first effective amount of the resistant starch, in combination with the "effective amount of the animal feed component," is preferably sufficient to cause the feed efficiency of the first mammal, such as the first ruminant, to increase by at least about ten percent, and more preferably by at least about twenty percent, versus the feed efficiency of the second mammal, such as the second ruminant, as measured over a segment of the pre-weaning period, preferably over a four week segment of the pre-weaning period, and more preferably over the entire pre-weaning period.

Also, the first effective amount of the resistant starch, in combination with the "effective amount of the animal feed component," is preferably sufficient to cause the first mammal, such as the first ruminant, to gain at least about ten percent more weight, and more preferably at least about twenty percent more weight, than the second mammal (such as the second ruminant) gains, as measured over a segment of the pre-weaning period, preferably over a one week segment of the pre-weaning period, more preferably over a four week segment of the pre-weaning period, and still more preferably over the entire pre-weaning period.

Additionally, the first effective amount of the resistant starch, in combination with the "effective amount of the animal feed component," is preferably sufficient to cause the first mammal, such as the first ruminant, to consume at least about five percent more, and preferably at least about ten percent more of the animal feed component (weight basis), as compared to the amount of animal feed component (weight basis) consumed by the second mammal, such as the second ruminant, over a segment of the pre-weaning period, preferably over a one week segment of the pre-weaning period, more preferably over a four week segment of the pre-weaning period, and still more preferably over the entire pre-weaning period.

Furthermore, the first effective amount of the resistant starch, in combination with the "effective amount of the animal feed component," is preferably sufficient to cause the first mammal, such as the first ruminant, to exhibit a scour score that is at least about five percent less, more preferably at least about ten percent less, and still more preferably at least about fifteen percent less, than the scour score of the second mammal, such as the second ruminant, over a segment of the pre-weaning period, preferably over a one week segment of the pre-weaning period, more preferably over a two week segment of the pre-weaning period, still more preferably over a four week segment of the pre-weaning period, and even more preferably over the entire pre-weaning period.

Next, the first effective amount of the resistant starch, in combination with the "effective amount of the animal feed component," is preferably sufficient to cause the number of days the first mammal, such as the first ruminant, exhibits a scour score greater than one to decrease at least about ten percent, more preferably at least about fifteen percent, still more preferably at least about twenty percent, even more preferably at least about thirty percent, and most preferably at least about forty percent, versus the number of days the second mammal, such as the second ruminant, exhibits a scour score greater than one, as measured over a segment of the pre-weaning period, preferably over a one week segment of the pre-weaning period, more preferably over a four week segment of the pre-weaning period, and still more preferably over the entire pre-weaning period.

Finally, the first effective amount of the resistant starch, in combination with the "effective amount of the animal feed component," is preferably sufficient to cause the number of days the first mammal, such as the first ruminant, exhibits a respiratory score of one to decrease at least about five percent, more preferably at least about ten percent, and still more preferably by one hundred percent, as compared to the number of days the second mammal, such as the second ruminant, exhibits a respiratory score of one, as measured over a segment of the pre-weaning period, preferably over a one week segment of the pre-weaning period, more preferably over a four week segment of the pre-weaning period, and still more preferably over the entire pre-weaning period.

For these comparisons of the first mammal (such as the first ruminant) and the second mammal (such as the second ruminant) that are provided above in regard to the first effective amount of the resistant starch and the effective amount of the animal feed component, the first mammal and the second mammal may be provided substantially the same animal feed component, but preferably are provided the same animal feed component. Furthermore, in these comparisons of the first mammal (such as the first ruminant) and the second mammal (such as the second ruminant) that are provided above in regard to the first effective amount of the resistant starch and the effective amount of the animal feed component, the first mammal and the second mammal are preferably provided with the same amount of the animal feed component, based on the dry weight of the animal feed component, while the first mammal and the second mammal are given equal access to water ad libitum.

Furthermore, in these comparisons of the first mammal (such as the first ruminant) and the second mammal (such as the second ruminant) that are provided above in regard to the first effective amount of the resistant starch and the effective amount of the animal feed component during the pre-weaning period, the first mammal preferably receives the fluid animal feed as a combination of the animal feed component and the resistant starch. Also in these comparisons of the first mammal (such as the first ruminant) and the second mammal (such as the second ruminant) that are provided above in regard to the first effective amount of the resistant starch and the effective amount of the animal feed component during the pre-weaning period, the second mammal preferably receives the fluid animal feed as a combination of the animal feed component and the starch, such as corn starch, other than resistant starch, with the starch other than resistant starch being provided to the second mammal at the same weight rate as the resistant starch is provided to the first mammal.

Though these comparisons that are provided above in regard to the first effective amount of the resistant starch and the effective amount of the animal feed component are provided in terms of a first mammal (such as a first ruminant) and a second mammal (such as a second ruminant), these comparisons are equally applicable to a first group of mammals (such as a first group of ruminants) versus a second group of mammals (such as a second group of ruminants), respectively. In this comparison of groups of mammals (such as ruminants), the first group of mammals and the second group of mammals preferably include about the same number of mammals, preferably include the same or similar species (or the same or about the same weighting of different species), and preferably each include mammals with the same, or about the same, median age.

As another approach, the second effective amount of the resistant starch may be considered in a comparison of the first mammal (such as the first ruminant) with a third mammal (such as a third ruminant), where the first mammal is fed the second effective amount of the resistant starch in combination with both (1) starch other than the resistant starch and (2) the "effective amount of the animal feed component." When used in combination with the starch other than resistant starch and with the second effective amount of the resistant starch, the "effective amount of the animal feed component" is the amount of the animal feed component that is fed to the first mammal (such as the first ruminant) during the period when the resistant starch and the starch other than the resistant starch are fed to the first mammal.

When used in combination with the second effective amount of the resistant starch, the animal feed component is preferably fed to the first ruminant (a first calf, for example) at the enhanced feeding rate (above about 1.25 pounds of the animal feed component per day, based on the dry weight of the animal feed component) for the animal feed component for most, if not all, of the feeding period. Nevertheless, when provided along with the second effective amount of the resistant starch, it is believed the effective amount of the animal feed component may permissibly be about 1.25 pounds, or less, of the animal feed component per ruminant (per calf, for example) per day for a substantial amount, most, or even all of the feeding period, while still realizing benefits in accordance with the present invention. When the effective amount of the animal feed component is used in combination with the second effective amount of the resistant starch, the animal feed component, the resistant starch, and the starch other than the resistant starch are preferably fed to the first mammal (such as the first ruminant) together as part of the fluid animal feed.

Taking these considerations into account, the "second effective amount of the resistant starch," as used herein, means an amount of the resistant starch that, when fed during the pre-weaning period along with the effective amount of the animal feed component and with starch other than the resistant starch to the first mammal (such as the first ruminant):

(1) that is provided an equal amount of the same, or substantially the same, animal feed component as the third mammal (such as the third ruminant), where the animal feed component is provided at an equal rate to both the first mammal and the third mammal, (2) while the first mammal is provided with the first effective amount of the resistant starch and a quantity of the starch other than the resistant starch, and the third mammal is provided with the starch other than resistant starch, with the weight of the starch other than resistant starch provided to the third mammal being equal to the combined weight of (a) the resistant starch and (b) the starch other than the resistant starch provided to the first mammal, and (3) while the first mammal and the third mammal also have equal access to water ad libitum, is effective to cause at least one, preferably at least two, more preferably at least three, still more preferably at least four, even more preferably at least five, and most preferably all six of the following improvements that are listed in (a), (b), (c), (d), (e), and (f) below:

(a) an increase in the feed efficiency of the first mammal versus the feed efficiency of the third mammal, as measured over a segment of the pre-weaning period, preferably over a four week segment of the pre-weaning period, and more preferably over the entire pre-weaning period, (b) a larger amount of weight gain by the first mammal versus the amount of weight gain by the third mammal as measured over a segment of the pre-weaning period, preferably over a one week segment of the pre-weaning period, more preferably over a four week segment of the pre-weaning period, and still more preferably over the entire pre-weaning period, (c) a larger amount of animal feed component consumption by the first mammal versus the amount of animal feed component consumption by the third mammal over a segment of the pre-weaning period, preferably over a one week segment of the pre-weaning period, more preferably over a four week segment of the pre-weaning period, and still more preferably over the entire pre-weaning period, (d) a decreased scour score by the first mammal versus the scour score of the third mammal over a segment of the pre-weaning period, preferably over a one week segment of the pre-weaning period, more preferably over a four week segment of the pre weaning period, and still more preferably over the entire pre-weaning period, (e) a decrease in the number of days where the scour score of the first mammal is greater than one versus the number of days where the scour score of the third mammal is greater than one, as measured over a segment of the pre-weaning period, preferably over a one and/or two week segment of the pre-weaning period, more preferably over a four week segment of the pre-weaning period, and still more preferably over the entire pre-weaning period, and/or (f) a decrease in the number of days where the respiratory score of the first mammal is one versus the number of days where the respiratory score of the third mammal is one, as measured over a segment of the pre-weaning period, preferably over a one week segment of the pre-weaning period, more preferably over a four week segment of the pre-weaning period, and still more preferably over the entire pre-weaning period.

The second effective amount of the resistant starch, in combination with the "effective amount of the animal feed component" and the starch other than resistant starch, is preferably sufficient to cause the feed efficiency of the first mammal, such as the first ruminant, to increase by at least about ten percent, more preferably by at least about twenty percent, and still more preferably by at least about twenty-five percent, versus the feed efficiency of the third mammal, such as the third ruminant, as measured over a segment of the pre-weaning period, preferably over a four week segment of the pre-weaning period, and more preferably over the entire pre-weaning period.

Also, the second effective amount of the resistant starch, in combination with the "effective amount of the animal feed component" and the starch other than resistant starch, is preferably sufficient to cause the first mammal, such as the first ruminant, to gain at least about ten percent more weight, more preferably at least about twenty percent more weight, and still more preferably at least about thirty percent more weight than the third mammal (such as the third ruminant) gains, as measured over a segment of the pre-weaning period, preferably over a one week segment of the pre-weaning period, more preferably over a four week segment of the pre-weaning period, and still more preferably over the entire pre-weaning period.

Additionally, the second effective amount of the resistant starch, in combination with the "effective amount of the animal feed component" and the starch other than resistant starch, is preferably sufficient to cause the first mammal to consume at least about three and a half percent more, and preferably at least about five percent more, of the animal feed component (weight basis), as compared to the amount of animal feed component (weight basis) consumed by the third mammal over a segment of the pre-weaning period, preferably over a one week segment of the pre-weaning period, more preferably over a four week segment of the pre-weaning period, and still more preferably over the entire pre-weaning period.

Furthermore, the second effective amount of the resistant starch, in combination with the "effective amount of the animal feed component" and the starch other than resistant starch, is preferably sufficient to cause the first mammal, such as the first ruminant, to exhibit a scour score that is at least about five percent less, more preferably at least about ten percent less, and still more preferably at least about fifteen percent less, than the scour score of the third mammal, such as the third ruminant, over a segment of the pre-weaning period, preferably over a one week segment of the pre-weaning period, more preferably over a four week segment of the pre-weaning period, and still more preferably over the entire pre-weaning period.

Next, the second effective amount of the resistant starch, in combination with the "effective amount of the animal feed component" and the starch other than resistant starch, is preferably sufficient to cause the number of days the first mammal (such as the first ruminant) exhibits a scour score greater than one to decrease at least about ten percent, more preferably at least about fifteen percent, still more preferably at least about twenty percent, even more preferably at least about thirty percent, and most preferably at least about forty percent, versus the number of days the third mammal (such as the third ruminant) exhibits a scour score greater than one, as measured over a segment of the pre-weaning period, preferably over a one week segment of the pre-weaning period, more preferably over a four week segment of the pre-weaning period, and still more preferably over the entire pre-weaning period.

Finally, the second effective amount of the resistant starch, in combination with the "effective amount of the animal feed component" and the starch other than resistant starch, is preferably sufficient to cause the number of days the first mammal (such as the first ruminant) exhibits a respiratory score of one to decrease at least about five percent, more preferably at least about ten percent, and still more preferably by one hundred percent, as compared to the number of days the third mammal (such as the third ruminant) exhibits a respiratory score of one, as measured over a segment of the pre-weaning period, preferably over a one week segment of the pre-weaning period, more preferably over a four week segment of the pre-weaning period, and still more preferably over the entire pre-weaning period.

For these comparisons of the first mammal (such as the first ruminant) and the third mammal (such as the third ruminant) that are provided above in regard to the second effective amount of the resistant starch and the effective amount of the animal feed component, the first mammal and the third mammal may be provided substantially the same animal feed component, but preferably are provided the same animal feed component. Furthermore, in these comparisons of the first mammal (such as the first ruminant) and the third mammal (such as the third ruminant) that are provided above in regard to the second effective amount of the resistant starch and the effective amount of the animal feed component, the first mammal and the third mammal are preferably provided with the same amount of the animal feed component, based on the dry weight of the animal feed component, while the first mammal and the third mammal are given equal access to water ad libitum.

Furthermore, in these comparisons of the first mammal (such as the first ruminant) and the third mammal (such as the third ruminant) that are provided above in regard to the second effective amount of the resistant starch and the effective amount of the animal feed component during the pre-weaning period, the first mammal preferably receives the fluid animal feed as a combination of the animal feed component, the resistant starch, and the starch other than the resistant starch. Also in these comparisons of the first mammal (such as the first ruminant) and the third mammal (such as the third ruminant) that are provided above in regard to the second effective amount of the resistant starch and the effective amount of the animal feed component during the pre-weaning period, the third mammal preferably receives the fluid animal feed as a combination of the animal feed component and the starch, such as corn starch, other than resistant starch, with the starch other than resistant starch being provided to the third mammal at the same weigh rate as the combination of (a) the resistant starch and (b) the starch other than the resistant starch are provided to the first mammal.

Though these comparisons that are provided above in regard to the second effective amount of the resistant starch are provided in terms of a first mammal (such as a first ruminant) and a third mammal (such as a third ruminant), these comparisons are equally applicable to a first group of mammals (such as a first group of ruminants) versus a third group of mammals (such as a third group of ruminants), respectively. In this comparison of groups of mammals, the first group of mammals and the third group of mammals preferably include about the same number of mammals, preferably include the same or similar species (or the same or about the same weighting of different species), and preferably each include mammals with the same, or about the same, median age.

One product of the present invention may be characterized as a mammal ration, such as a ruminant ration. The mammal ration includes at least the animal feed component and the resistant starch, where the resistant starch and the animal feed component are preferably combined with each other, as previously discussed. Consistent with the discussions above, the weight ratio of the resistant starch to the animal feed component, such as the milk replacer, that is provided to the young mammal(s), such as the young ruminant(s), may range from about 0.1:100 to about 10:100, based upon the dry weight of the resistant starch and the dry weight of the animal feed component. Preferably, the weight ratio of the resistant starch to the animal feed component, such as the milk replacer, that is provided to the young mammal(s), such as the young ruminant(s), ranges from about 1:100 to about 7.5:100, based upon the dry weight of the resistant starch and the dry weight of the animal feed component. Another product of the present invention may be characterized as a daily ration that may be fed to a mammal, such as a ruminant, during the pre-weaning period. The daily ration includes at least the animal feed component and the resistant starch, where the resistant starch and the animal feed component are preferably combined with each other, as previously discussed. The amount of the animal feed component present in the daily ration is preferably greater than about 1.25 pounds, on a dry matter basis, during the pre-weaning period, especially when the daily ration is fed to young ruminants, such as calves.

In one embodiment, the mammal ration (such as the ruminant ration), comprises an effective amount of a fluid animal feed; and an effective amount of resistant starch, the mammal ration effective to improve the health of the mammal (such as the ruminant) as determined by a member selected from the group consisting of: increasing the feed efficiency of a first mammal on the first diet during a feeding period, as compared to the feed efficiency of a second mammal on a second diet during the feeding period; increasing the amount of weight gained by a first mammal on the first diet during a feeding period, as compared to the amount of weight gained by a second mammal on a second diet during the feeding period; increasing the amount of milk replacer consumed by a first mammal on the first diet during a feeding period, as compared to the amount of milk replacer consumed by a second mammal on a second diet during the feeding period; decreasing scour in a first mammal on the first diet during a feeding period, as compared to scour in a second mammal on a second diet during the feeding period, decreasing respiratory distress in a first mammal on the first diet during a feeding period as compared to the respiratory distress of a second mammal on a second diet during the feeding period; and combinations thereof; where the first diet and the second diet are identical except the second diet is free of the resistant starch; the first mammal may be, for example, a first ruminant, such as a first calf; the second mammal may be, for example, a second ruminant, such as a second calf; and the mammal ration maybe a ruminant ration.

As another option, the resistant starch described herein may be incorporated in otherwise conventional weaning formulations that are known in the art for feeding newborn mammals, such as newborn monogastrics (including pigs), other than ruminants. In these conventional weaning formulations for mammals other than ruminants (subsequently referred to as "non-ruminant mammals"), some portion of non-resistant starch (such as rapidly digestible starch or slowly digestible starch) employed in the conventional weaning formulations is replaced with the resistant starch of the present invention. Some suitable, though non-exhaustive, examples of the resistant starch that may be incorporated in conventional weaning formulations for non-ruminant mammals in place of some non-resistant starch are the HI-MAIZE® high amylose resistant starches available from Penford Australia Limited. HI-MAIZE® 958 starch and HI-MAIZE® 1043 starch are two particularly preferred high amylose resistant starches that may be incorporated in conventional weaning formulations for non-ruminant mammals in place of some non-resistant starch. In a particular conventional weaning formulation for non-ruminant mammals, any amount, such as about 0.05 weight percent up to about ten weight percent, or even more, of the non-resistant starch of the conventional weaning formulation, based on the total weight of the non-resistant starch in the conventional weaning formulation, may be replaced by resistant starch, in accordance with the present invention, without necessarily otherwise modifying the conventional weaning formulation.

Ultimately, when feeding young non-ruminant mammals, such as young monogastrics (including pigs), a weaning formulation in which about 0.1 weight percent to about 10 weight percent (or even more, such as up to about 15 weight percent or up to about 20 weight percent) of the non-resistant starch of the weaning formulation, based on the total weight of the non-resistant starch in the weaning formulation, has been replaced with resistant starch, and during a weaning period feeding trial ranging from about three days to about twenty days (and optionally ranging from about seven to about fourteen days or from about ten days to twelve days), (1) the average weight gain of the monogastrics, such as pigs, fed the resistant-starch-containing weaning formulation is greater than, and preferably ranges from about three percent greater to about fifteen percent greater (or even more) than, the average weight gain of monogastrics, such as pigs, fed the weaning formulation in which no resistant starch is substituted in place of non-resistant starch; (2) the average daily feed intake (weight basis) of the monogastrics, such as pigs, fed the resistant-starch-containing weaning formulation is greater than, and preferably ranges from about three percent greater to about fifteen percent greater (or even more) than, the average daily feed intake (weight basis) of monogastrics, such as pigs, fed the weaning formulation in which no resistant starch is substituted in place of non-resistant starch; and (3) the feed efficiency of the monogastrics, such as pigs, fed the resistant-starch-containing weaning formulation is greater than, and preferably ranges from about two percent greater to about five percent greater, or even more, than, the feed efficiency of monogastrics, such as pigs, fed the weaning formulation in which no resistant starch is substituted in place of non-resistant starch.

Various analytical techniques are employed herein. An explanation of these techniques follows. All values presented in this document for a particular parameter, such as weight percent total protein, weight percent fat, and weight percent total solids, are based on the "as is" sample and are therefore on a "wet basis", unless otherwise specified herein.

Property Determination & Characterization Techiniques

Particle Size Analysis

Granule size determinations for a starch sample may be determined using a MasterSizer particle size analyzer that utilizes a HE-Ne laser (632.8 nm) with a maximum output of 5 mW CW. Such a MasterSizer particle size analyzer is available from Malvern Instruments Inc., of Southborough, Mass. In the method that employs this particle size analyzer, a starch slurry is made using approximately 15 mL of distilled water in a 50 mL beaker. The resulting slurry is sonicated for about four minutes. The slurry is then introduced into the stirred cell of the MasterSizer particle size analyzer and the obscuration value is adjusted using distilled water to 0.20. The slurry is then stirred for about two more minutes before particle size readings are taken. Four particle size readings should preferably be taken for each sample to assure the readings are stable and repeatable.

Procedure for Separating Starch from Maize Grain

The method by which starch was separated from the maize grain was as follows:
1. Prepare 200 g meal by grinding the maize grain through the 2 mm then the 1 mm screen of one Retsch Mill.
2. Wet the milled grain from step 1 thoroughly, stirring by hand, with 600 ml 0.1 N NaOH.
3. Add 2,200 ml 0.1 N NaOH to the contents obtained in step 2 and blend 5 minutes at ⅔ speed with the Ultra Turrax.
4. Sieve the contents of step 3 over 44μ screen.
5. Return sieve overs from step 4 with 1 L water and blend for another 3 minutes, if necessary.
6. Sieve the contents of step 5 over 44μ screen.
7. Centrifuge the combined filtrate from steps 4 and 6 at 3000 rpm for 15 minutes. Decant. Wipe out the neck of the bottle with a tissue to remove fat.
8. Reslurry starch (centrifugate from step 7) with 200 ml water, i.e. 50 ml in each of 4 tubes. Centrifuge.
9. Remove starch from centrifuge tubes with about 250 ml water to form a starch slurry.
10. Adjust pH of starch slurry to 6.0-6.5 with 0.5 N HCl. Filter again over 44μ screen, if necessary.
11. Buchner filter and air dry starch obtained in step 10. This starch may then be used in the Amylose Content Content Determination and in the Resistant Starch Content Determination referenced herein and described below.

Amylose Content Determination

The amylose concentration of a particular starch sample may be determined using the amylose content determination procedure that is disclosed in U.S. Pat. No. 5,714,600. The entire content of U.S. Pat. No. 5,714,600 is hereby incorporated by reference herein in its entirety. For the purposes of the description of the invention, the method by which amylose was determined is set out below.

METHOD: Apparent Amylose (Blue Value)
SCOPE: High Amylose Maize Starch
APPARATUS:
 Defatting:
 Soxhlet extraction apparatus
 Steam bath
 Whatman thimbles, 25.times.80 mm
 Drying Oven 105° C.
 Dessicator
 Amylose Determination:
 Stoppered 50 ml test tubes
 Vortex mixer
 Boiling Water bath
 Spectrophotometer (650 mm, slit width 0.2 mm)
REAGENTS:
 Defatting:
 Methanol (AR Grade)
 Amylose Determination:
 Dimethylsulfoxide (HPLC Grade)
 Iodine/Potassium iodide solution
  3.0 g iodine and 30 g potassium iodide made up to 1000 mls with 0.1 N sodium hydroxide
 Methanol (AR Grade)
 Amylose (Sigma Cat. No. A0512):
  Dried for 2 hours at 105° C. prior to use.
PROCEDURE:
 Defatting:
 (1) Weigh 5 grams of starch into the thimble.
 (2) Place the thimble in the Soxhlet apparatus.
 (3) Extract the sample with methanol (200 mls) for 20 hours.
 (4) Recover the thimble & dry in oven at 105° C. for 12 hours.
 Amylose Determination:
 (1) Accurately weigh starch (100.0 to 105.0 mg) into the text tube.
 (2) Add methanol (1 ml) and vortex mix.
 (3) Add DMSO (15 mls), invert the test tube, and vortex mix.
 (4) Place the test tubes in a vigorously boiling water bath for 60 minutes.
 (5) Invert and vortex mix each test tube at 15 minute intervals during this period.
 (6) Add distilled water (15 mls), invert and vortex mix. Place the test tube in the boiling water bath for a further 30 minutes.
 (7) Quantitatively transfer the contents of the test tube to a 100 ml volumetric flask (use a funnel in the flask). Make the solution to volume with distilled water.
 (8) Transfer an aliquot (3 mls) of this solution to a 100 ml volumetric flask and add 90 mls of distilled water.

(9) Add Iodine/Potassium Iodide solution (1 ml) to the diluted solution and immediately shake and mix thoroughly. Make to volume with distilled water.

(10) Measure the absorbance of this solution at 605 nm compared to a blank consisting of Iodine/Potassium Iodide solution (1 ml) diluted to 100 mls with distilled water in a volumetric flask.

CALCULATIONS:

For native starches: % Amylose dsb=Absorbance×13 wt. sample dsb.

Resistant Starch Content Determination

The resistant starch determination of a particular starch sample may be determined using the resistant starch determination procedure that is disclosed in McClearly et al, "A Rapid Procedure for Total Starch Measurement in Cereal Grains and Products," pp 304-312, Proc. 42nd RACI Cereal Chem. Conf., Christchurch, NZ, Ed. VJ Humphrey-Taylor (1992). The entire content of McClearly et al., "A Rapid Procedure for Total Starch Measurement in Cereal Grains and Products," pp 304-312, Proc. 42nd RACI Cereal Chem. Conf., Christchurch, NZ, Ed. VJ Humphrey-Taylor (1992) is hereby incorporated by reference herein in its entirety. For the purposes of the description of the invention, the method by which resistant starch was determined is set out below.

Resistant Starch Determination

The amount of resistant starch is determined by subtracting the amount of susceptible starch from the amount of total starch. The procedure for total starch determination and the procedure for susceptible starch determination are provided below: The procedure for susceptible starch determination immediately follows the procedure for total starch determination.

Total Starch Determination

Starch or flour sample (100±10 mg, accurately weighed) is weighed into a glass test-tube (14×120 nm) and the tube is tapped so that all sample falls to the bottom of the tube. The sample is wet with aqueous ethanol (0.2 mL, 50% v/v) and stirred on a vortex mixer. DMSO (1 ml) is added using a positive displacement dispenser, while the tube is being stirred. The tube is immediately placed in a vigorously boiling water bath and cooled for 2 min. After 2 min, an aliquot (2 mL) of thermostable α-amylase (80 units) in 50 mM MOPS buffer (pH 7.0) is added to the tube (while still in the boiling water bath) and the mixture is incubated for 1 min, removed from the bath and vigorously mixed on a vortex stirrer for 10 sec. The tube is returned to the boiling water bath for a further 1 min. After exactly 2 min (from time of addition of the α-amylase, remove the tube from the bath and add an aliquot (4.0 mL) of 100 mM sodium acetate buffer (pH 4.5) containing pullulanase (10 units) and β-amylase (100 units). Mix the tube contents vigorously for 10-20 sec and incubate the tubes at 50° C. for 1 hour. Stir the tube contents 2-3 times during this incubation period.

Quantitatively transfer the tube contents to a 100 mL volumetric flask (washing the tube with water from a wash bottle) and adjust the volume to the mark. Aliquots (0.1 mL) in triplicate are transferred to the bottom of glass test tubes. To two of these (reaction tubes) is added amyloglucosidase (0.1 mL, 2 Units) in sodium acetate buffer (100 mM, pH 4.5) and to the third (the "blank") is added sodium acetate buffer (0.1 mL, 100 mM, pH 4.5). The tubes are incubated at 50° C. for 29 min. The absorbance of the reaction solution and reaction blank is measured (510 nm) against a reagent blank.

The reagent blank is prepared by incubating GOPOD reagent (3.0 mL) with acetate buffer (0.2 mL, 100 mM, pH 4.5) at 50° C. concurrent with the reaction solutions. Glucose standards (50 and 100 ig in 0.2 mL) are incubated concurrently with GOPOD reagent (3.0 mL).

Susceptible Starch Determination

In this procedure, the sample is weighed and wet with aqueous ethanol, as in the total starch determination. The sample is then treated with an aliquot (1.0 mL) of thermostable á-amylase (80 units), stirred vigorously and placed in a vigorously boiling water bath. After 1 min, the tube is removed from the bath, stirred vigorously and returned to the boiling water bath for a further 10 min. The tubes are then treated with cold, dilute sulphuric acid (2 mL, 0.2%) and placed in a rack in water at room temperature (approx. 22° C). The volume is adjusted to 100 mL and aliquots (0.1 mL) in triplicate are removed for glucose determination after amyloglucosidase treatment (as in total starch determination).

Dry Sample Weight Determination

To determine the dry weight of a particular sample, the sample is first weighed. The weighed sample is then dried in an oven at a temperature that is adequate to drive moisture from the sample without degrading the sample components, such as at a temperature ranging from about 100° C. to about 110° C. The oven drying is continued until the weight of the dried sample remains constant, despite additional oven drying.

Total Solids Determination

To determine the weight percent total solids, wet basis, in a sample, the actual weight of total solids is determined by analyzing the sample in accordance with Method #925.23 (33.2.09) of *Official Methods of Analysis*, Association of Official Analytical Chemists (AOAC) (168 Ed., 1995). The weight percent total solids, wet basis, is then calculated by dividing the actual weight of total solids by the actual weight of the sample.

Total Protein Determination

To determine the percent of total protein, wet basis, in a sample, the actual weight of total protein is determined in accordance with Method #991.20% (33.2.11) of *Official Methods of Analysis*, Association of Official Analytical Chemists (AOAC) ($16^{th}$ Ed., 1995). The value determined by the above method yields "total Kjeldahl nitrogen", which is ordinarily equivalent to "total protein" since the above method incorporates a factor that accounts for the average amount of nitrogen in protein. Since any and all total Kjeldahl Nitrogen determinations presented herein are based on the above method, and since the term "total protein" is sometimes also referred to as "crude protein", the terms "total Kjeldahl Nitrogen," "total protein," and "crude protein" are used interchangeably herein. The weight percent total protein, wet basis, is calculated by dividing the actual weight of total protein that is determined in accordance with this method by the total weight of the sample.

Scour Documentation

The scour level of a mammal (such as a ruminant) or a group of mammals (such as a group of ruminants) may be quantified in accordance with this procedure. First, Scour Scores are rated on a scale of 1 to 4, for each individual mammal, based upon the appearance of the mammal's feces using the following score definitions:

Scour Score=1 for a normal feces

Scour Score=2 for loose feces

Scour Score=3 for feces exhibiting separated water

Scour Score=4 for diarrhea indicative of severe dehydration

A scour score is assigned daily to each mammal, according to this scale. For an individual mammal, the scour scores over a period of days may be averaged to determine an average scour score for that mammal over the period. For a group of mammals, the scour scores assigned to the different mammals on each day of the period may be averaged to determine an average scour score for that group of mammals over the period.

As another alternative, changes in the scour status for a particular mammal (such as a particular ruminant) may be tracked by noting, for example, the number of days during the period when the scour score was greater than 1 versus the number of days during the period when the scour score was equal to 1. Likewise, differences in scour status between different mammals (such as between different ruminants) over a particular period may be tracked and characterized by comparing the number of days during the period when the scour score was equal to 1 for the different mammals of the group Respiratory Distress Documentation The respiratory distress level of a mammal (such as a ruminant or a monogastric) or a group of mammals (such as a group of ruminants or a group of monogastrics) may be quantified in accordance with this procedure. First, respiratory scores are rated on a scale of 0 to 1, for each individual mammal based upon the following definitions:

A Respiratory Score of 0 is assigned on a particular day if the mammal is not given antibiotics for treatment of a respiratory infection.

Alternatively, a Respiratory Score of 1 is assigned on a particular day if the mammal is given antibiotics for treatment of a respiratory infection.

A respiratory score is assigned daily to each mammal, according to this scale. For an individual mammal, the respiratory scores over a period of days maybe averaged to determine an average respiratory score for that mammal over the period. For a group of mammals, the respiratory scores assigned to the different mammals on each day of the period may be averaged to determine an average respiratory score for that group of mammals over the period.

As another alternative, changes in respiratory health for a particular mammal (such as a particular ruminant or monogastric) may be tracked by noting, for example, the number of days during the period when the respiratory score was 1 versus the number of days during the period when the respiratory score was 0. Likewise, differences in respiratory health between different mammals (such as between different ruminants or different monogastrics) over a particular period may be tracked and characterized by comparing the number of days during the period when the respiratory score was equal to 1 versus the number of days during the period when the respiratory score was 0 for the different mammal of the group.

The present invention is more particularly described in the following examples that are intended as illustrations only since numerous modifications and variations within the scope of the present invention will be apparent to those skilled in the art.

EXAMPLE

This Example that is provided below demonstrates the effect of providing young ruminants, in particular young calves, during the pre-weaning period, with resistant starch and calf milk replacer, as compared to the effect of providing young calves, during the pre-weaning period, with calf milk replacer, but without any resistant starch. This Example further demonstrates the effect of providing young calves, during the pre-weaning period, with resistant starch, corn starch, and calf milk replacer, as compared to the effect of providing young calves, during the pre-weaning period, with calf milk replacer and corn starch, but without any resistant starch.

In this Example, test cattle were first weighed upon arrival at the test facility and were also weighed at the beginning of the first week of the pre-weaning period and at the end of the first, second, third, and fourth weeks of the pre-weaning period. Besides weight, other performance parameters, scouring observations, and antibiotic administrations were documented on a daily basis and summarized for each of the four individual weeks during the four week pre-weaning period feeding trial.

All data that is provided in Tables 2-11 below is based upon individual data for each calf, then-present, as least square means of the particular data over all calves present in the test at the time the particular data was recorded. Data for parameters presented in Tables 2-11 was analyzed using the general linear model (GLM) statistical procedure of SAS™ statistical analysis software for a randomized complete block design that included both the particular feed regimen and the week of the test period in the model statement. The SAS™ statistical analysis software is available from SAS Institute, Inc. of Cary, N.C. Additionally, all data was analyzed to determine the mean of the data for each variable under consideration during the collection period for the particular data.

Additionally, the PDiff function of the GLM statistical procedure was used to characterize the mean values of the data by providing for comparisons between mean data values for the calves of different treatments for particular test parameters or variables. The probability value P is a measure of the statistical probability that the differing parameter values between (1) the test animals provided with resistant starch and calf milk replacer, (2) the test animals provided with both resistant starch and corn starch along with calf milk replacer, and (3) the control animals provided with the calf milk replacer and corn starch, but not provided any resistant starch, may be explained by the difference between receiving the resistant starch, receiving the resistant starch in combination with corn starch, and/or receiving corn starch, but no resistant starch.

A P value of 0.05 means that five times out of 100 the results may be explained by factors other than differences between the different treatments. Likewise, a P value of 0.77 means that 77 times out of 100, the difference in results between the control group and a group provided with the resistant starch or a combination of the resistant starch and corn starch maybe explained by factors other than differences between the different treatments. For purposes of comparing data in this document, P values of 0.20, or lower, are considered to be statistically significant. Thus, where a P value of 0.20 or less is returned for a particular variable, it is assumed that the differing results are fully explained by the test regimen, i.e.: the presence or lack of the resistant starch or providing resistant starch in combination with corn starch.

Also, many of Tables 2-11 include a coefficient of variation for data in a particular row. A coefficient of variation is simply the standard deviation of a particular variable that is divided by the mean of the variable and then multiplied by 100. Because variances and standard deviations are used to measure error, and because these values for variances and standard deviations are sensitive to the absolute scale of the variable, coefficients of variations are provided, since coefficients of variation remove the influence of the overall magnitude of the data.

This Example demonstrates the effect of providing young calves, during the pre-weaning period, with resistant starch and calf milk replacer, as compared to the effect of providing young calves, during the pre-weaning period, with calf milk replacer, but without any resistant starch. This Example further demonstrates the effect of providing young calves, during the pre-weaning period, with resistant starch and corn starch along with calf milk replacer, as compared to the effect of providing young calves, during the pre-weaning period, with calf milk replacer and corn starch, but without any resistant starch.

In this Example, fifty-four (54) Holstein bull calves from Wisconsin ranging in age from 3 days old to 10 days old and averaging about 100 pounds each, with a range of about 95 pounds to about 105 pounds each, were assigned to one of three different treatments. A first treatment is referred to herein as "Control", a second treatment is referred to herein as "RS Test One", and a third treatment is referred to herein as "RS Test Two".

Gamma globulin, as measured by the Zinc Sulfate Turbidity test and expressed in weight percent gamma globulin, was initially determined for each calf. Thereafter, each calf was assigned, in terms of the gamma globulin concentration for the calf, to either level (1), level (2), level (3), level (4), or level (5), where level (1) included calves with gamma globulin concentrations ranging from 0.00 to 0.49 weight percent; level (2) included calves with gamma globulin concentrations ranging from 0.50 to 0.99 weight percent; level (3) included calves with gamma globulin concentrations ranging from 1.00 to 1.49 weight percent; level (4) included calves with gamma globulin concentrations ranging from 1.50 to 2.49 weight percent; and level (5) included calves with gamma globulin concentrations of 2.5 weight percent or higher. Equal numbers of calves from the level (1) gamma globulin concentration range were placed in the three different treatments (Control, RS Test One, and RS Test Two); equal numbers of calves from the level (2) gamma globulin concentration range were placed in the three different treatments; equal numbers of calves from the level (3) gamma globulin concentration range were placed in the three different treatments; equal numbers of calves from the level (4) gamma globulin concentration range were placed in the three different treatments; and equal numbers of calves from the level (5) gamma globulin concentration range were placed in the three different treatments.

The calves from the three different treatments were each fed and monitored during the four week feeding trial of the pre-weaning period. Details about the handling, feed consumption, scour status, and medication provision for the calves of these three different treatments during the four week feeding trial are provided in Tables 2-11 below. The feeding trial for the handling, feed consumption, and medical condition and treatment details of this example spanned a total of four weeks of the pre-weaning period for the calves of the Control, RS Test One, and RS Test Two treatments.

During the four-week feeding trial of the pre-weaning period, none of the calves of the three different treatments had any access to dry calf ration, such as dry calf starter. However, during the four-week feeding trial of the pre-weaning period, each calf of each treatment had continuing and equal access to fresh water, ad libitum.

The calves of the three different treatments each received calf milk replacer during the four-week feeding trial of the pre-weaning period. The calf milk replacer that was provided to the calves of the Control, RS Test One, and RS Test Two treatments had a crude protein concentration of about 22 weight percent, based on the dry weight of the calf milk replacer, and a fat concentration of about 20 weight percent, based on the dry weight of the calf milk replacer. The calf milk replacer was provided to the calves of the three different treatments at an equal rate, though the rate at which the calf milk replacer was provided increased in Period 2 versus Period 1, increased in Period 3 versus Period 2, and increased in Period 4 versus Period 3, as depicted in Table 2.

During Period 1, the calf milk replacer was provided to the calves of the three different treatments in two equal feedings at an overall rate of about 1.2 pounds of calf milk replacer per calf per day (about 0.6 pounds of calf milk replacer per calf per feeding of calf milk replacer), based on the dry weight of the calf milk replacer. During Period 2, the calf milk replacer was provided to the calves of the three different treatments in two equal feedings at an overall rate of about 1.6 pounds of calf milk replacer per calf per day (about 0.8 pounds of calf milk replacer per calf per feeding of calf milk replacer), based on the dry weight of the calf milk replacer. During Period 3, the calf milk replacer was provided to the calves of the three different treatments in two equal feedings at an overall rate of about 2.0 pounds of calf milk replacer per calf per day (about 1.0 pounds of calf milk replacer per calf per feeding of calf milk replacer), based on the dry weight of the calf milk replacer. During Period 4, the calf milk replacer was provided to the calves of the three different treatments in two equal feedings at an overall rate of about 2.4 pounds of calf milk replacer per calf per day (about 1.2 pounds of calf milk replacer per calf per feeding of calf milk replacer), based on the dry weight of the calf milk replacer.

Thus, during Period 1, the calf milk replacer was provided to the calves of the three different treatments at the "standard feeding rate" for the calf milk replacer. On the other hand, during Periods 2, 3, and 4, the calf milk replacer was provided to the calves of the three different treatments at the "enhanced feeding rate" for the calf milk replacer.

In this Example, the calves of the Control treatment did not receive any of the resistant starch during the four-week feeding trial of the pre-weaning period. However, in this Example, the calves of the Control treatment did receive corn starch during the four-week feeding trial of the pre-weaning period. On the other hand, in this Example, the calves of the RS Test Two treatment received resistant starch during the four-week feeding trial of the pre-weaning period, but did not receive any of the corn starch during the four-week feeding trial of the pre-weaning period. Finally, in this Example, the calves of the RS Test One treatment received equal amounts of both the resistant starch and the corn starch during the four-week feeding trial of the pre-weaning period.

The calf milk replacer that was provided to the calves of the three different treatments during the four-week feeding trial of the pre-weaning period originated as powdered milk replacer that was rehydrated prior to being provided to the calves. The calf milk replacer was rehydrated with water to form rehydrated milk replacer having a total solids concentration ranging from about 10 weight percent to about 20 weight percent, based on the total weight of the rehydrated milk replacer. For the calves of the Control treatment, the resistant starch was added by hand to the powdered milk replacer before the powdered milk replacer was rehydrated. For the calves of the RS Test One treatment, the resistant starch and corn starch were added by hand to the powdered milk replacer before the powdered milk replacer was rehydrated. Likewise, for the calves of the RS Test Two treatment, the resistant starch was added by hand to the powdered milk replacer before the powdered milk replacer was rehydrated.

The resistant starch that was employed in both RS Test One and RS Test Two of this Example were HI-MAIZE® 1043 high amylose resistant starch that was obtained from Penford Australia Limited of Lane Cove, New South Wales, Australia. The corn starch that was employed in both the Control and in RS Test One of this example was obtained from A. E. Staley Manufacturing Company of Decatur, Ill. The resistant starch that was employed in both RS Test One and RS Test Two of this Example were HI-MAIZE® 1043 high amylose resistant starch that was obtained from Penford Australia Limited of Lane Cove, New South Wales, Australia. The corn starch that was employed in both the Control and in RS Test One of this example was STADEX® starch obtained from A. E. Staley Manufacturing Company of Decatur, Ill., which is a business of Tate & Lyle North America, a division of Tate & Lyle PLC. The STADEX® starch that was employed in both the Control and in RS Test One of this example had a particle size range of about 5 microns to about 25 microns and an average particle size of about 13.9 microns.

The fluid animal feed that was provided to the calves of the Control treatment included the rehydrated milk replacer (also referred to herein as the fluid milk replacer) and corn starch, along with a small amount of antibiotics, and did not contain any of the resistant starch. The fluid animal feed that was provided to the calves of the RS Test One treatment included the rehydrated milk replacer (also referred to herein as the fluid milk replacer), corn starch and resistant starch, along with a small amount of antibiotics. The fluid animal feed that was provided to the calves of the RS Test Two treatment included the rehydrated milk replacer (also referred to herein as the fluid milk replacer) and resistant starch, along with a small amount of antibiotics.

The antibiotics used for the calves of the Control, RS Test One, and RS Test Two treatments consisted of a blend of Neomycin and Oxytetracycline. The antibiotic blend was included in the fluid animal feed that was provided to the calves at the same concentration in the Control, RS Test One, and RS Test Two treatments to cause each calf in each of the three different treatments to receive the same daily dosage of each of the antibiotics of the antibiotic blend. Of course, the daily antibiotic dosage the calves of each of the three treatments received increased when going from Period 1 to Period 4 as the weight percent of milk replacer powder in the fluid milk replacer increased when going from Period 1 to Period 4 (see Table 4). For the calves of each of the three different treatments, the Neomycin was included in the fluid animal feed at the rate of 250 grams of Neomycin per ton of powdered milk replacer, based on the dry weight of the powdered milk replacer, and the Oxytetracycline was included in the fluid animal feed at the rate of 125 grams of Oxytetracycline per ton of powdered milk replacer, based on the dry weight of the powdered milk replacer.

The fluid animal feed was individually provided to each of the calves in each of the three different treatments twice per day at about 7:30 a.m. and again at about 4:00 p.m. Generally, the calves of each of the treatments quickly consumed a majority of their particular allotment of the fluid animal feed within a few minutes of being provided with the fluid animal feed, though the amount of the consumed fluid animal feed varied from calf to calf, as reflected in Table 6 below. Also, the calves of each of the three different treatments were, as previously indicated, given continuous and equal access to fresh water, but were not provided with any dry animal feed (such as calf starter or total calf ration) during the four-week feeding trial of the pre-weaning period. Furthermore, each test calf in the three different treatments received veterinary care and management consistent with appropriate recommendations in the *Guide for the Care and Use of Agricultural Animals in Agricultural Research and Teaching*. (1$^{st}$ Edition, March 1988).

Details about the diet of the calves during the four-week feeding trial of the pre-weaning period and details about the calf milk replacer component of the fluid animal feed for the three different treatments are provided in Tables 2, 3, and 4 below:

TABLE 2

Diet During 4-Week Feeding Trial

| Treatment Name | Milk Replacer (MR) Description | Cornstarch[C] (weight %)[D] | Resistant Starch[C] (weight %)[D] | Total Calf Ration (TCR) | Number of Calves |
|---|---|---|---|---|---|
| Control | 22:20[A] MR[B] | 5.0 | 0.0 | No | 18 |
| RS Test One | 22:20[A] MR[B] | 2.5 | 2.5 | No | 18 |
| RS Test Two | 22:20[A] MR[B] | 0.0 | 5.0 | No | 18 |

[A]The milk replacer had a crude protein concentration of about 22 weight percent, based on the dry weight of the milk replacer, and a fat concentration of about 20 weight percent, based on the dry weight of the milk replacer.
[B]Antibiotics included in milk replacer: NT 250:125 (Neomycin/Oxytetracycline @ 250/125 grams/ton of dry milk replacer).
[C]Combined with the milk replacer prior to adding water to form the fluid animal feed.
[D]Weight percentage is based on the dry weight of the milk replacer.

TABLE 3

Weekly Milk Replacer & Starch Provision Details During 4-Week Feeding Trial

| Period (Days) | Description | Control | RS Test One | RS Test Two |
|---|---|---|---|---|
| 1[B] (1–7) | Weight Percent Milk Replacer Powder In Fluid Milk Replacer[C] | 10.00 | 10.00 | 10.00 |
| | Pounds of Milk Replacer Powder Per Milk Replacer Feeding[A] | 0.6 | 0.6 | 0.6 |
| | Pounds of Water Per Milk Replacer Feeding[A] | 5.4 | 5.4 | 5.4 |
| | Pounds of Fluid Milk Replacer Per Milk Replacer Feeding[A] | 6.0 | 6.0 | 6.0 |
| | Total Pounds of Milk Replacer Powder Fed During Period | 8.4 | 8.4 | 8.4 |
| | Weight Percent Corn Starch Per Milk Replacer Feeding[D] | 5.0 | 2.5 | 0.0 |
| | Grams of Corn Starch Per Milk Replacer Feeding[A] | 13.62 | 6.81 | 0.0 |
| | Total Grams of Corn Starch Fed During Period | 190.68 | 95.34 | 0.0 |
| | Weight Percent Resistant Starch Per Milk Replacer Feeding[D] | 0.0 | 2.5 | 5.0 |
| | Grams of Resistant Starch Per Milk Replacer Feeding[A] | 0.0 | 6.81 | 13.62 |
| | Total Grams of Resistant Starch Fed During Period | 0.0 | 95.34 | 190.68 |
| 2[B] (8–14) | Weight Percent Milk Replacer Powder In Fluid Milk Replacer[C] | 12.12 | 12.12 | 12.12 |
| | Pounds of Milk Replacer Powder Per Milk Replacer Feeding[A] | 0.8 | 0.8 | 0.8 |
| | Pounds of Water Per Milk Replacer Feeding[A] | 5.8 | 5.8 | 5.8 |
| | Pounds of Fluid Milk Replacer Per Milk Replacer Feeding[A] | 6.6 | 6.6 | 6.6 |
| | Total Pounds of Milk Replacer Powder Fed During Period | 11.2 | 11.2 | 11.2 |
| | Weight Percent Corn Starch Per Milk Replacer Feeding[D] | 5.0 | 2.5 | 0.0 |
| | Grams of Corn Starch Per Milk Replacer Feeding[A] | 18.16 | 9.08 | 0.0 |
| | Total Grams of Corn Starch Fed During Period | 254.24 | 127.12 | 0.0 |
| | Weight Percent Resistant Starch Per Milk Replacer Feeding[D] | 0.0 | 2.5 | 5.0 |
| | Grams of Resistant Starch Per Milk Replacer Feeding[A] | 0.0 | 9.08 | 18.16 |
| | Total Grams of Resistant Starch Fed During Period | 0.0 | 127.12 | 254.24 |
| 3[B] (15–21) | Weight Percent Milk Replacer Powder In Fluid Milk Replacer[C] | 14.08 | 14.08 | 14.08 |
| | Pounds of Milk Replacer Powder Per Milk Replacer Feeding[A] | 1.0 | 1.0 | 1.0 |
| | Pounds of Water Per Milk Replacer Feeding[A] | 6.1 | 6.1 | 6.1 |
| | Pounds of Fluid Milk Replacer Per Milk Replacer Feeding[A] | 7.1 | 7.1 | 7.1 |
| | Total Pounds of Milk Replacer Powder Fed During Period | 14.0 | 14.0 | 14.0 |
| | Weight Percent Corn Starch Per Milk Replacer Feeding[D] | 5.0 | 2.5 | 0.0 |
| | Grams of Corn Starch Per Milk Replacer Feeding[A] | 22.7 | 11.35 | 0.0 |
| | Total Grams of Corn Starch Fed During Period | 317.8 | 158.9 | 0.0 |
| | Weight Percent Resistant Starch Per Milk Replacer Feeding[D] | 0.0 | 2.5 | 5.0 |
| | Grams of Resistant Starch Per Milk Replacer Feeding[A] | 0.0 | 11.35 | 22.7 |

TABLE 3-continued

Weekly Milk Replacer & Starch Provision Details During 4-Week Feeding Trial

| Period (Days) | Description | Control | RS Test One | RS Test Two |
|---|---|---|---|---|
| | Total Grams of Resistant Starch Fed During Period | 0.0 | 158.9 | 317.8 |
| 4[B] (22–28) | Weight Percent Milk Replacer Powder In Fluid Milk Replacer[C] | 16.00 | 16.00 | 16.00 |
| | Pounds of Milk Replacer Powder Per Milk Replacer Feeding[A] | 1.2 | 1.2 | 1.2 |
| | Pounds of Water Per Milk Replacer Feeding[A] | 6.3 | 6.3 | 6.3 |
| | Pounds of Fluid Milk Replacer Per Milk Replacer Feeding[A] | 7.5 | 7.5 | 7.5 |
| | Total Pounds of Milk Replacer Powder Fed During Period | 16.8 | 16.8 | 16.8 |
| | Weight Percent Corn Starch Per Milk Replacer Feeding[D] | 5.0 | 2.5 | 0.0 |
| | Grams of Corn Starch Per Milk Replacer Feeding[A] | 27.24 | 13.62 | 0.0 |
| | Total Grams of Corn Starch Fed During Period | 381.36 | 190.68 | 0.0 |
| | Weight Percent Resistant Starch Per Milk Replacer Feeding[D] | 0.0 | 2.5 | 5.0 |
| | Grams of Resistant Starch Per Milk Replacer Feeding[A] | 0.0 | 13.62 | 27.24 |
| | Total Grams of Resistant Starch Fed During Period | 0.0 | 190.68 | 381.36 |

[A]Two Feedings of Milk Replacer per day for the Control, RS Test One, and RS Test Two treatments during Period 1 thru Period 4.
[B]Each period had a seven day duration.
[C]Based on the total weight of the Fluid Milk Replacer
[D]Based on the total weight of the Milk Replacer Powder included in the Fluid Milk Replacer

TABLE 4

Cumulative Milk Replacer & Starch Provision Details During 4-Week Feeding Trial

| Periods (Days) | Description | Control | RS Test One | RS Test Two |
|---|---|---|---|---|
| 1–4[B] (1–28) | Average Weight Percent Milk Replacer Powder In Fluid Milk Replacer[C] | 13.235 | 13.235 | 13.235 |
| | Average Pounds of Milk Replacer Powder Per Milk Replacer Feeding[A] | 0.9 | 0.9 | 0.9 |
| | Average Pounds of Water Per Milk Replacer Feeding[A] | 5.9 | 5.9 | 5.9 |
| | Average Pounds of Fluid Milk Replacer Per Milk Replacer Feeding[A] | 6.8 | 6.8 | 6.8 |
| | Total Pounds of Milk Replacer Powder Fed During Periods 1–4 | 50.4 | 50.4 | 50.4 |
| | Weight Percent Corn Starch Per Milk Replacer Feeding[D] | 5.0 | 2.5 | 0.0 |
| | Grams of Corn Starch Per Milk Replacer Feeding[A] | 20.43 | 10.21 | 0.0 |
| | Total Grams of Corn Starch Fed During Period | 1144.08 | 572.04 | 0.0 |
| | Weight Percent Resistant Starch Per Milk Replacer Feeding[D] | 0.0 | 2.5 | 5.0 |
| | Grams of Resistant Starch Per Milk Replacer Feeding[A] | 0.0 | 10.21 | 20.43 |
| | Total Grams of Resistant Starch Fed During Period | 0.0 | 572.04 | 1144.08 |

[A]Two Feedings of Milk Replacer per day for the Control, RS Test One, and RS Test Two treatments during Period 1 thru Period 4.
[B]Each period had a seven day duration.
[C]Based on the total weight of the Fluid Milk Replacer
[D]Based on the total weight of the Milk Replacer Powder included in the Fluid Milk Replacer Next, details about the average weight gain per calf during the four individual periods of the four-week feeding trial of the pre-weaning period along with an average total weight gain per calf over the entire four-week feeding trial for the three different treatments are provided in Table 5 below:

TABLE 5

Weight Gain During 4-Week Feeding Trial

| Average Gain Per Calf | Control | RS Test One | RS Test Two | Coefficient of Variation (C.V.) |
|---|---|---|---|---|
| Period 1[A] (lbs) | −0.42 | 0.07 | 0.62 | 5474.16 |
| Period 2[A] (lbs) | 1.14[e] | 3.71[f] | 3.29[f] | 175.75 |
| Period 3[A] (lbs) | 10.22 | 10.21 | 10.02 | 23.40 |
| Period 4[A] (lbs) | 9.52[x] | 10.57[xy] | 10.92[y] | 24.09 |
| Period 1 Through Period 4 (lbs) | 20.46[b] | 24.55[a] | 24.86[a] | 24.28 |

[A]Each period had a seven day duration.
[a,b]Numbers within the same row with different single letter superscripts differ at a probability value of $P < 0.05$
[x,y]Numbers within the same row with different single letter superscripts differ at a probability value of $P < 0.10$
[e,f]Numbers within the same row with different single letter superscripts differ at a probability value of $P < 0.20$ The data presented in Table 5 shows that differences between the feeding regimens of the RS Test One and RS Test Two treatments versus the feeding regimen of the Control treatment, namely inclusion of resistant starch in the RS Test One and RS Test Two treatments, generally increased the average gain per calf during the four-week feeding trial of the pre-weaning period for the calves of the RS Test One and RS Test Two treatments, versus the calves of the Control treatment. Indeed, these results of Table 5 show a dramatic increase in average weight gain per calf during Period 2 of the four-week feeding trial. The RS Test One treatment during Period 2 caused the average weight gain per calf to increase by more than 225% (P<0.20) versus the average weight gain per calf of the Control treatment. Likewise, the RS Test Two treatment during Period 2 caused the average weight gain per calf to increase by more than 200% (P<0.20) versus the average weight gain per calf of the Control treatment. Also, the RS Test Two treatment during Period 4 caused the average weight gain per calf to increase by nearly 15% (P<0.10) versus the average weight gain per calf of the Control treatment during Period 4.

Furthermore, these results of Table 5 show a dramatic increase in average weight gain per calf over the entire four-week feeding trial. The RS Test One treatment caused the average weight gain per calf over the four weeks of Period 1 through Period 4 to increase by nearly 20% (P<0.05) versus the average weight gain per calf of the Control treatment over this four week period. Likewise, the RS Test Two treatment caused the average weight gain per calf over the four weeks of Period 1 through Period 4 to increase by nearly 21.5% (P<0.05) versus the average weight gain per calf of the Control treatment over this four week period.

Next, details about the average milk replacer consumption per calf during the four individual periods of the four-week feeding trial of the pre-weaning period along with an average total milk replacer consumption per calf over the entire four-week feeding trial are provided for the three different treatments in Table 6 below:

TABLE 6

Milk Replacer Consumption During 4-Week Feeding Trial

| Average Milk Replacer Consumption[A] Per Calf | Control | RS Test One | RS Test Two | Coefficient of Variation (C.V.) |
|---|---|---|---|---|
| Period 1[B] (lbs) | 6.97[b] | 7.54[ab] | 7.74[a] | 15.02 |
| Period 2[B] (lbs) | 10.36[b] | 11.01[a] | 11.01[a] | 7.39 |
| Period 3[B] (lbs) | 13.70 | 13.83 | 13.98 | 4.13 |
| Period 4[B] (lbs) | 16.20 | 16.57 | 16.74 | 6.36 |
| Period 1 Through Period 4 (lbs) | 47.22[b] | 48.95[a] | 49.48[a] | 5.07 |

[A]Milk Replacer Consumption Weight is provided on a dry matter (dm) basis
[B]Each period had a seven day duration.
[a,b]Numbers within the same row with different single letter superscripts differ at a probability value of P < 0.05

The data presented in Table 6 shows that differences between the feeding regimens of the RS Test One and RS Test Two treatments versus the feeding regimen of the Control treatment, namely inclusion of resistant starch in the RS Test One and RS Test Two treatments, generally increased the average milk replacer consumption per calf during the four-week feeding trial of the pre-weaning period for the calves of the RS Test One and RS Test Two treatments, versus the calves of the Control treatment.

Indeed, these results of Table 6 show a substantial increase in average milk replacer consumption per calf during Period 1 of the four-week feeding trial. For example, the RS Test Two treatment during Period 1 caused the average milk replacer consumption per calf to increase by more than 11% (P<0.05) versus the average milk replacer consumption per calf of the Control treatment.

Furthermore, these results of Table 6 show a significant increase in average milk replacer consumption per calf during Period 2 of the four-week feeding trial. For example, the RS Test One treatment during Period 2 caused the average milk replacer consumption per calf to increase by nearly 6.3% (P<0.05) versus the average milk replacer consumption per calf of the Control treatment. Likewise, the RS Test Two treatment during Period 2 caused the average milk replacer consumption per calf to increase by nearly 6.3% (P<0.05) versus the average milk replacer consumption per calf of the Control treatment.

Finally, these results of Table 6 show a significant increase in average total milk replacer consumption per calf over the entire four-week feeding trial. First, the RS Test One treatment caused the average milk replacer consumption per calf over the four weeks of Period 1 through Period 4 to increase by more than 3.5% (P<0.05) versus the average milk replacer consumption per calf of the Control treatment over this four week period. Likewise, the RS Test Two treatment caused the average milk replacer consumption per calf over the four weeks of Period 1 through Period 4 to increase by nearly 4.8% (P<0.05) versus the average milk replacer consumption per calf of the Control treatment over this four week period.

Next, weight, weight gain, and feed efficiency details over the entire four-week feeding trial are provided for the three different treatments in Table 7 below:

TABLE 7

Feed Efficiency During 4-Week Feeding Trial

| Description | Control | RS Test One | RS Test Two | Coefficient of Variation (C.V.) |
|---|---|---|---|---|
| Average Initial Ig[A] For All Calves | 1.48 | 1.58 | 1.48 | 48.30 |
| Average[B] Initial Weight Per Calf, lbs. (at start of period 1) | 97.43 | 97.76 | 97.43 | 4.22 |
| Average[C] Ending Weight Per Calf, lbs. (at end of period 4) | 117.89 | 122.31 | 122.29 | 24.28 |
| Average[D] Total Gain Per Calf During Period 1 Through Period 4 (lbs) | 20.46[b] | 24.55[a] | 24.86[a] | 24.28 |

TABLE 7-continued

Feed Efficiency During 4-Week Feeding Trial

| Description | Control | RS Test One | RS Test Two | Coefficient of Variation (C.V.) |
|---|---|---|---|---|
| Feed Efficiency Average[E] During Periods 1–4 | 0.39[b] | 0.49[a] | 0.47[a] | 27.91 |

[A]Expressed in weight percent, as measured by Zinc Sulfate Turbidity test, then assigned to level 1, level 2, level 3, level 4, or level 5 as follows: (1) Ig = 0.00–0.49, (2) Ig = 0.50–0.99, (3) Ig = 1.00–1.49, (4) Ig = 1.50–2.49, (5) Ig = 2.5 and higher.
[B]The initial weight(s) of calves that were present in period 1 but did not complete period 4 are not included in this average.
[C]This average excludes calves that were present in period 1 but did not complete period 4.
[D]This average will not necessarily equal the value obtained by subtracting the average initial weight per calf (at the start of period 1) from the average ending weight per calf (at the end of period 4), since this average is the sum of the weekly average gains per calf for periods 1–4 which may include one or more calves that did not finish period 4.
[E]The Feed Efficiency Average is a ratio of the weight gained versus the weight of feed consumed. The Feed Efficiency Average During Periods 1–4 is the mean of each Feed Efficiency Average of each of the individual periods (1–4) for each individual calf.
[a,b]Numbers within the same row with different single letter superscripts differ at a probability value of P < 0.05

The data presented in Table 7 demonstrates that differences between the feeding regimens of the RS Test One and RS Test Two treatments versus the feeding regimen of the Control treatment, namely inclusion of resistant starch in the RS Test One and RS Test Two treatments, generally increased the average gain per calf during the four-week feeding trial of the pre-weaning period for the calves of the RS Test One and RS Test Two treatments, versus the calves of the Control treatment. Indeed, these results of Table 7 show a dramatic increase in average weight gain per calf over the entire four-week feeding trial. First, the RS Test One treatment caused the average weight gain per calf over the four weeks of Period 1 through Period 4 to increase by nearly 20% (P<0.05) versus the average weight gain per calf of the Control treatment over this four week period. Likewise, the RS Test Two treatment caused the average weight gain per calf over the four weeks of Period 1 through Period 4 to increase by nearly 21.5% (P<0.05) versus the average weight gain per calf of the Control treatment over this four week period.

These details of Table 7 also demonstrate that differences between the feeding regimens of the RS Test One and RS Test Two treatments versus the feeding regimen of the Control treatment, namely inclusion of resistant starch in the RS Test One and RS Test Two treatments, generally increased the feed efficiency average for the calves during the four-week feeding trial of the pre-weaning period for the calves of the RS Test One and RS Test Two treatments, versus the feed efficiency average for the calves of the Control treatment. For example, the RS Test One treatment caused the feed efficiency average for the calves during the four-week feeding trial of the pre-weaning period for the calves to increase by more than 25% (P<0.05) versus the feed efficiency average for the calves of the Control treatment during the four-week feeding trial. Likewise, the RS Test Two treatment caused the feed efficiency average for the calves during the four-week feeding trial of the pre-weaning period for the calves to increase by more than 20% (P<0.05) versus the feed efficiency average for the calves of the Control treatment during the four-week feeding trial.

With regard to the superscript letters [C] and [D] in Table 7 above, the average weights of calves are presented for different points in time during the test regimen and exclude any calf or calves not present at the end of a period over which a particular measurement was made or averaged, even though that calf was present or those calves were present at the start of the period over which the particular measurement was made or averaged. This phenomena merely recognizes that there is virtually always some degree of mortality in young calves, whether those calves are involved in testing different feeding regimens or are merely being fed outside of an experimental test regimen. Typically, in the experience of the inventors, mortality rates for calves generally range up to about ten percent, during shorter-length testing programs, such as the four-week feeding trial of this Example.

Next, details about average calf scour scores over the four-week feeding trial are provided for the three different treatments in Table 8 below:

TABLE 8

Average Calf Scour Scores Per Calf During 4-Week Feeding Trial

| Average Calf[B] Scour Score[A] | Control | RS Test One | RS Test Two | Coefficient of Variation (C.V.) |
|---|---|---|---|---|
| Period 1[C] | 1.95 | 1.86 | 1.79 | 27.18 |
| Period 2[C] | 1.43[e] | 1.40[ef] | 1.22[f] | 29.13 |
| Period 3[C] | 1.08 | 1.04 | 1.02 | 13.64 |
| Period 4[C] | 1.00 | 1.03 | 1.00 | 4.33 |
| Average[D] Calf Scour Score[A] for Periods 1–2 | 1.69[e] | 1.63[ef] | 1.51[f] | 24.89 |
| Average[D] Calf Scour Score[A] for Periods 1–4 | 1.36 | 1.33 | 1.26 | 16.30 |

[A]Scour Scores are rated on a scale of 1 to 4, for each individual calf, based upon the appearance of the calves feces:
Scour Score = 1 for a normal feces
Scour Score = 2 for loose feces
Scour Score = 3 for feces exhibiting separated water
Scour Score = 4 for diarrhea indicative of sever calf dehydration
[B]The Average Scour Score per calf for an individual period was determined by first assigning a scour score to each calf on each day of the period and then collectively averaging all daily scour scores assigned for each of the calf.
[C]Each period had a seven day duration.
[D]The Average Scour Score per calf over a range of two or more periods was determined by averaging the Average Scour Scores per calf that were previously determined for each of the individual periods included in the range.
[e,f]Numbers within the same row with different single letter superscripts differ at a probability value of P < 0.20

The data presented in Table 8 demonstrates that differences between the feeding regimens of the RS Test One and RS Test Two treatments versus the feeding regimen of the Control treatment, namely inclusion of resistant starch in the RS Test One and RS Test Two treatments, generally decreased the average calf scour score during the four-week feeding trial of the pre-weaning period for the calves of the RS Test One and RS Test Two treatments, versus the calves of the Control treatment. Indeed, these results of Table 8 show a significant decrease in average calf scour score during the four-week feeding trial.

For example, the RS Test Two treatment caused the average calf scour score during Period 2 to decrease by nearly 14.7% (P<0.20) versus the average calf scour score of the Control treatment during Period 2. Likewise, the RS Test Two treatment caused the average calf scour score over the two weeks of Period 1 through Period 2 to decrease by more than 10.6% (P<0.20) versus the average calf scour score of the Control treatment during Period 1 through Period 2.

Next, details about the average calf scour days over the four-week feeding trial are provided for the three different treatments in Table 9 below:

TABLE 9

Average Calf Scour Days During 4-Week Feeding Trial

| Average Calf Scour[A] Days[B] During: | Control | RS Test One | RS Test Two | Coefficient of Variation (C.V.) |
|---|---|---|---|---|
| Period 1[C] | 4.94 | 4.00 | 4.11 | 44.38 |
| Period 2[C] | 2.33[x] | 2.13[xy] | 1.22[y] | 98.45 |
| Period 3[C] | 0.39 | 0.20 | 0.11 | 303.36 |
| Period 4[C] | 0.00 | 0.13 | 0.00 | 484.37 |
| Total[D] Average Scour Days For Periods 1–2 | 7.28[x] | 6.13[xy] | 5.33[y] | 50.31 |
| Total[D] Average Scour Days For Periods 1–4 | 7.67[x] | 6.47[xy] | 5.44[y] | 53.25 |

[A]Scour Scores are rated on a scale of 1 to 4, for each individual calf, based upon the appearance of the calves feces:
Scour Score = 1 for a normal feces
Scour Score = 2 for loose feces
Scour Score = 3 for feces exhibiting separated water
Scour Score = 4 for diarrhea indicative of sever calf dehydration
[B]The Average Calf Scour Days for an individual period was determined by (a) first recording, by calf, how many days during the period the calf had a Scour Score of 2 or more to arrive at each calve's individual Scour Day measure for the period and then (b) collectively averaging all individual Scour Day measures of each calf determined in (a) during the period.
[C]Each period had a seven day duration.
[D]The Total Average Scour Days over a range of two or more periods was determined by totaling each of the Average Calf Scour Days for each of the individual periods included in the range.
[x,y]Numbers within the same row with different single letter superscripts differ at a probability value of P < 0.10

The data of Table 9 demonstrates that differences between the feeding regimens of the RS Test One and RS Test Two treatments versus the feeding regimen of the Control treatment, namely inclusion of resistant starch in the RS Test One and RS Test Two treatments, generally decreased the average calf scour days during the four-week feeding trial of the pre-weaning period for the calves of the RS Test One and RS Test Two treatments, versus the average calf scour days of the Control treatment. Indeed, these results of Table 9 show a substantial decrease in average calf scour days during Period 2 of the four-week feeding trial. For example, the RS Test Two treatment during Period 2 caused the average calf scour days to decrease by nearly 48% (P<0.10) versus the average calf scour days of the Control treatment during Period 2.

Furthermore, these results of Table 9 show a substantial decrease in average calf scour days over the two week segment extending from Period 1 through Period 2 of the four-week feeding trial. For example, the RS Test Two treatment during this two week period caused the average calf scour days to decrease by nearly 26.8% (P<0.10) versus the average calf scour days of the Control treatment during this two week period.

Finally, these results of Table 9 show a substantial decrease in average calf scour days over the four week segment extending from Period 1 through Period 4 of the four-week feeding trial. For example, the RS Test Two treatment during this four week period caused the average calf scour days to decrease by more than 29% (P<0.10) versus the average calf scour days of the Control treatment during this four week period.

Next, details about the average calf respiratory score over the four-week feeding trial are provided for the three different treatments in Table 10 below:

TABLE 10

Average Calf Respiratory Score During 4-Week Feeding Trial

| Average[B] Calf Respiratory Score[A] During: | Control | RS Test One | RS Test Two | Coefficient of Variation (C.V.) |
|---|---|---|---|---|
| Period 1[C] | 0.00[f] | 0.07[ef] | 0.22[e] | 466.60 |
| Period 2[C] | 0.72 | 0.67 | 0.28 | 281.38 |
| Period 3[C] | 0.94[f] | 0.20[e] | 0.89[f] | 205.62 |
| Period 4[C] | 0.67[f] | 0.00[e] | 0.50[ef] | 281.52 |
| Total[D] Average Calf Respiratory Score for Periods 1–4 | 2.33 | 0.93 | 1.89 | 182.66 |

[A]A Respiratory Score of either 0 or 1 is assigned to each calf each day. A Respiratory Score of 1 is assigned on a particular day if the calf is given antibiotics for treatment of a respiratory infection, and a Respiratory Score of 0 is assigned on a particular day if the calf is not given antibiotics for treatment of a respiratory infection.
[B]The Average Calf Respiratory Score for an individual period was determined by (a) first recording each calves Respiratory Score for each day of the period; (b) then, for each calf individually averaging the total of all Respiratory Scores for all days in the period; and then (c) collectively averaging the individual Respiratory Score Averages determined in (b) of all of the calves.
[C]Each period had a seven day duration.
[D]The Total Average Calf Respiratory Score over a range of two or more periods was determined by totaling each of the Average Calf Respiratory Scores for each of the individual periods included in the range.
[e,f]Numbers within the same row with different single letter superscripts differ at a probability value of P < 0.20

The data of Table 10 demonstrates that differences between the feeding regimens of the RS Test One and RS Test Two treatments versus the feeding regimen of the Control treatment, namely inclusion of resistant starch in the RS Test One and RS Test Two treatments, generally decreased the average calf respiratory score during the four-week feeding trial of the pre-weaning period for the calves of the RS Test One and RS Test Two treatments, versus the average calf respiratory score for the calves subjected to the Control treatment. Indeed, these results of Table 10 illustrate a significant decrease in average calf respiratory scores during Period 3 of the four-week feeding trial. For example, the RS Test Two treatment during Period 3 caused the average calf respiratory to decrease by more than 5% (P<0.20) versus the average calf respiratory score attributable to the Control treatment during Period 3.

Furthermore, these results of Table 10 illustrate a substantial decrease in average calf respiratory scores during the final week (Period 4) of the four-week feeding trial. For example, the RS Test One treatment during Period 4 caused the average calf respiratory score to decrease by 100% (P<0.20) to an average calf respiratory score of zero versus the average calf respiratory score of the Control treatment during Period 4.

Next, details about the average electrolyte and antibiotic costs for treatment of scours and respiratory ailments occurring over the four-week feeding trial are provided in Table 11 below for calves subjected to the three different treatments:

TABLE 11

Average Electrolyte and Antibiotic Costs During 4-Week Feeding Trial

| Period[B] | Variable[A] | Control | RS Test One | RS Test Two | Coefficient of Variation (C.V.) |
|---|---|---|---|---|---|
| 1 | Average Electrolyte Cost for Period | $5.83 | $6.00 | $4.59 | 70.68 |
|   | Average Antibiotic Cost for Period | $0.12 | $0.18 | $0.17 | 365.25 |
|   | Average Electrolyte & Antibiotic Cost for Period | $5.95 | $6.18 | $4.76 | 72.58 |
| 2 | Average Electrolyte Cost for Period | $3.42[e] | $3.14[ef] | $1.78[f] | 113.82 |
|   | Average Antibiotic Cost for Period | $0.55 | $0.58 | $0.32 | 269.78 |
|   | Average Electrolyte & Antibiotic Cost for Period | $3.98[e] | $3.73[ef] | $2.10[f] | 113.57 |
| 3 | Average Electrolyte Cost for Period | $0.64 | $0.33 | $0.07 | 341.90 |
|   | Average Antibiotic Cost for Period | $0.80 | $0.57 | $0.81 | 194.86 |
|   | Average Electrolyte & Antibiotic Cost for Period | $1.44 | $0.90 | $0.88 | 193.59 |
| 4 | Average Electrolyte Cost for Period | $0.00 | $0.45 | $0.00 | 711.16 |
|   | Average Antibiotic Cost for Period | $0.46 | $0.00 | $0.39 | 301.94 |
|   | Average Electrolyte & Antibiotic Cost for Period | $0.46 | $0.45 | $0.39 | 302.19 |
| Total of Average Electrolyte Costs for Periods 1–4 | | $9.89[e] | $9.92[e] | $6.44[f] | 79.67 |
| Total of Average Antibiotic Cost for Periods 1–4 | | $1.93 | $1.33 | $1.70 | 166.45 |
| Total of Average Electrolyte & Antibiotic Cost for Periods 1–4 | | $11.82[e] | $11.25[ef] | $8.13[f] | 80.81 |

[A] All Variables (Average Electrolyte Cost for Period, Average Antibiotic Cost for Period, Average Electrolyte & Antibiotic Cost for Period, Total of Average Electrolyte Costs for Periods 1–4, Total of Average Antibiotic Cost for Periods 1–4, and Total of Average Electrolyte & Antibiotic Cost for Periods 1–4) are on a per calf basis . . .
[B] Each period had a seven day duration.
[e,f] Numbers within the same row with different single letter superscripts differ at a probability value of $P < 0.20$ The details of Table 11 demonstrate that differences between the feeding regimens of the RS Test One and RS Test Two treatments versus the feeding regimen of the Control treatment, namely inclusion of resistant starch in the RS Test One and RS Test Two treatments, generally decreased the average treatment cost per calf during the four-week feeding trial of the pre-weaning period for the calves of the RS Test One and RS Test Two treatments, versus the average treatment cost per calf subjected to the Control treatment.

For example, the RS Test Two treatment during Period 2 caused the average electrolyte cost per calf during Period 2 to decrease by nearly 48% (P<0.20) versus the average electrolyte costs per calf attributable to the Control treatment during Period 2. Furthermore, the RS Test Two treatment during the four weeks of Period 1 through Period 4 caused the average electrolyte cost per calf during this four week period to decrease by nearly 35% (P<0.20) versus the average electrolyte costs per calf attributable to the Control treatment during this four week period.

As yet another example, the RS Test Two treatment during Period 2 caused the average electrolyte and antibiotic cost per calf during Period 2 to decrease by more than 47% (P<0.20) versus the average electrolyte and antibiotic cost per calf attributable to the Control treatment during Period 2. Furthermore, the RS Test Two treatment during the four weeks of Period 1 through Period 4 caused the average electrolyte and antibiotic cost per calf during this four week period to decrease by more than 31% (P<0.20) versus the average electrolyte and antibiotic cost per calf attributable to the Control treatment during this four week period.

Monogastric Weaning Formulation

In a comparison of feeding young pigs three different weaning formulations, various benefits were observed. One of the three different weaning formulations was simply a conventional, commercially-available pig weaning formulation, served as the control or baseline, and is referred to as the "first pig weaning formulation" herein. Another (referred to herein as the "second pig weaning formulation") of the three different weaning formulations was the conventional, commercially-available pig weaning formulation in which about 2.5 weight percent of the non-resistant starch (typically readily digestible corn starch (CS)) of the conventional, commercially-available pig weaning formulation, based on the total weight of the non-resistant starch in the conventional, commercially-available pig weaning formulation, was replaced with a high amylose resistant starch. HI-MAIZE® 1043 starch was used in this example as the resistant starch. However, HI-MAIZE® 958 starch, high amylose maize flour, or any other source of resistant starch could be used. Finally, the third (referred to herein as the "third pig weaning formulation") of the three different weaning formulations was the conventional, commercially-available pig weaning formulation in which about 5.0 weight percent of the non-resistant starch of the conventional, commercially-available pig weaning formulation, based on the total weight of the non-resistant starch in the conventional, commercially-available pig weaning formulation, was replaced with resistant starch. Other than for substituting resistant starch for some of the non-resistant starch in the conventional commercially-available pig weaning formulation, the second pig weaning and the third pig weaning formulation were the same as the first pig weaning formulation.

While the resistant starch compositions were incorporated into the pig weaning formulation at 2.5% and 5% w/w levels of the total composition for this example, incorporation at other levels is anticipated. For example, in a particular conventional weaning formulation for non-ruminant mammals, any amount, such as about 0.05 weight percent up to about ten weight percent, or even more, of the non-resistant starch of the conventional weaning formulation, based on the total weight of the non-resistant starch in the conventional weaning formulation, maybe replaced by resistant starch, in accordance with the present invention, without necessarily otherwise modifying the conventional weaning formulation.

During an eleven day feeding trial that started about twenty days after the pigs were born, where a first group of pigs was fed the first pig weaning formulation, a second group of pigs was fed the second pig weaning formulation, and a third group of pigs was fed the third pig weaning formulation, the average weight gain of the second group was about 5.6 percent greater than the average weight gain of the first group, and the average weight gain of the third group was about 13.6 percent greater than the average weight gain of the first group. During the eleven day feeding trial, the first, second, and third groups of pigs had equal access to the first, second, and third pig weaning formulations, respectively. Additionally, during the eleven day feeding trial, the first, second, and third groups of pigs all had equal and continuing access to drinking water.

During the eleven day feeding trial, the average daily weight of feed intake of the second group was about 3.6 percent greater than the average daily weight of feed intake of the first group, and the average daily weight of feed intake of the third group was about 10.2 percent greater than the average daily weight of feed intake of the first group. Furthermore, during the eleven day feeding trial, the feed efficiency of the second group was about 3.7 percent greater than the feed efficiency of the first group, and the feed efficiency of the third group was about 3.4 percent greater than the feed efficiency of the first group. Feeding the pigs the second pig weaning formulation and the third pig weaning formulation earlier in the life of the pigs, rather than later, is believed important, since similar gains of the second and third groups of pigs over the first group of pigs were not consistently realized in a subsequent seven day feeding trial that started immediately after the eleven day feeding trial ended.

Additional Modes for Carrying out the Invention

In order to better understand the scope of this invention, a number of additional examples relating to food compositions intended for human consumption will now be described.

Breakfast Cereals

The resistant starch of the invention may be used to advantage in a variety of ready-to-eat breakfast cereals. These include flaked cereals, extruded flake cereals, extruded gun-puffed cereals, extruded and other shredded cereals, oven-puffed cereals, granola cereals and extruded expanded cereals.

(1) Flaked Cereals

While still in grit form A-958 (HI-MAIZE® high amylose starch 80%, available from Starch Australasia Limited) may be processed to make a cornflake by using higher than conventional levels of water addition and longer cooking times. The final toasted product (formulation 2571/1) has a light color and is significantly higher in dietary fiber content as is shown in Table 12.

(2) Extruded Flake

An extruded flake product was made by rotary cooking, cold form pelleting, flaking and toasting according to formulation 2562/1. It will be seen from Table 12 that 2562/1 had a significantly higher dietary fiber content as compared with the control.

| INGREDIENTS | FORMULATION: EXTRUDED FLAKE | |
|---|---|---|
| | 2562/1 (%) | Control (%) |
| Maize Polenta | 45.0 | 45.0 |
| Starch A958 | 42.0 | — |
| Regular Maize Starch | — | 42.0 |
| Sugar | 8.7 | 8.7 |
| Salt | 1.9 | 1.9 |
| Malt | 2.5 | 2.5 |
| | 100.0 | 100.0 |

Formulations 2459/2(b) and 2459/2(c) were prepared as 2562/1. However, 2459/2(b) were tempered overnight while for 2459/2(c), the flakes were dried out at 70° C. for 30 minutes prior to flaking.

| INGREDIENTS | FORMULATION: EXTRUDED FLAKE (MULTIGRAIN) | |
|---|---|---|
| | 2459/2(b) (%) | 2459/2(c) (%) |
| Starch A958 | 43.1 | 43.1 |
| Rice | 11.5 | 11.5 |
| Oats | 11.5 | 11.5 |
| Wheat | 20.7 | 20.7 |
| Sugar | 8.6 | 8.6 |
| Malt | 2.6 | 2.6 |
| Salt | 2.0 | 2.0 |
| | 100.0 | 100.0 |

The textural properties of the resultant flakes were significantly different for each formulation with the 2459/2 forming hollow or pillow-like flakes, whereas 2459/2(c) had a wrinkled, blistered appearance.

The dietary fiber content of the two flake formulations 2459/2(b) and 2459/2(c) are set out in Table 12, from which it will be seen that overnight tempering of the moist pellet containing starch A958 increases the total dietary fiber content of the resultant flake significantly. A further extruded flake product was made according to formulation 2556/1.

| INGREDIENTS | FORMULATION: EXTRUDED FLAKE 2556/1 (%) |
|---|---|
| Wholegrain Calrose | 56.0 |
| Rice | 7.0 |
| Wheatgerm | 6.9 |
| Sugar | 1.5 |
| Salt | 1.3 |
| Malt | 6.3 |
| Icing Sugar Mixture | 12.6 |
| Gluten | 8.4 |
| Starch A958 | 100.0 |

The dietary fiber content for 2556/1 is set out in Table 12.

TABLE 12

DIETARY FIBER CONTENT OF BREAKFAST CEREALS

| Formulation | Moisture Content % | Total Dietary Fiber (% dsb) | Soluble Dietary Fiber (% dsb) | Insoluble Dietary Fiber (% dsb) |
|---|---|---|---|---|
| Cornflake Control: | 4.6 | 4.0 | 1.0 | 2.9 |
| 2571/1 | 6.2 | 20.7 | 1.2 | 19.5 |
| 2562/1 | 4.7 | 12.4 | 0.4 | 12.0 |
| Control | 6.5 | 3.9 | 0.3 | 3.5 |
| 2459/2(b) | 4.3 | 17.1 | — | — |
| 2459/2(c) | 5.0 | 15.3 | — | — |
| 2556/1 | 5.4 | 4.5 | 1.1 | 3.5 |

(3) Wheat Bites

This product is a crunchy "pillow" which may be consumed as a ready-to-eat cereal with milk or eaten piece-wise as a snack. The formulation of the product is as follows:

| Ingredient | % (wet mix) |
|---|---|
| Fine wholemeal flour | 36.67 |
| Castor sugar | 15.35 |
| Oat Flour | 12.80 |
| Starch A958 | 11.94 |
| Fine Bran #3 | 8.53 |
| Vitamin B1 | 0.0051 |
| Vitamin B2 | 0.0043 |
| Niacin | 0.0316 |
| Iron | 0.0145 |
| Honey | 1.19 |
| Water | 13.47 |
| | 100.00 |

Preparation of the product is as follows:
(a) premix dry ingredients;
(b) process cereal mix with honey and water in a twin screw extruder;
(c) crimp and cut ropes from extruder to form individual pillows;
(d) toast pillows to reduce moisture and develop color and flavor.

The product was found to have excellent crunch after contact with milk for five minutes. It has a distinctive appearance being a pillow with "strand" markings. Total dietary fiber content was found to be 10%, at a moisture content of 2-4%. The product is unusual in that it has a light airy texture with a relatively high level of total dietary fiber.

The cereal products described above were characterized by several physical properties which were quite unexpected. For example, some of the flakes were blistered whilst others were bubbled and appeared as if "popped". These characteristics are highly desirable and would not have been considered achievable using formulations of this type.

In addition, these cereal products extrude well, display moderate to high expansion, yielding a final product with a medium to coarse cell structure. The products are unusual in that they have a light airy texture whilst containing a relatively high level of total dietary fiber.

The breakfast cereal products have also been found to have an excellent "bowl life" in that the flakes retained their crunch after contact with milk for five minutes. Furthermore, during processing and prior to toasting, it was observed that the flakes had a tendency to stick less to each other as compared with the control.

Bread

A number of bread samples were prepared using a high amylose starch and for comparison a waxy maize starch "MAZACA" trade mark of Starch Australasia Limited. The starches were incorporated into the bread at a 5% and a 10% level of flour replacement.

In Table 13, set out below, are the results obtained for each of the bread samples. These results clearly show that at both the 5% and 10% levels of high amylose starch, the dietary fiber content was substantially more than both the control product and the mazaca based product.

Furthermore, it should be noted that the actual level of dietary fiber found was significantly more than would be expected. This suggests that a synergistic effect occurred during baking. Indeed, it would have been expected that the dietary fiber content would decrease as resistant starch is destroyed during such heating processes.

TABLE 13

| Analysis | Wheat Starch Control | | High Amylose Starch | | Mazaca | |
|---|---|---|---|---|---|---|
| Total dietary fiber* % (DB) | — | | 27 | | 0 | |
| Test Baking | | | | | | |
| Rate of flour replacement (%) | 0 | 5 | 10 | 5 | 10 | 5 | 10 |
| Water absorption (%) | — | — | — | 58 | 58 | 58 | 58 |
| Total loaf score (%) | 76 | 80 | 76 | 75 | 73 | 79 | 71 |
| Fiber in Bread | | | | | | |
| FDF % (DB) | 4.2 | 4.0 | — | 6.9 | 8.7 | 4.0 | |
| (approx. expected** TDF %) | — | — | — | 5.2 | 6.4 | 4.0 | |

*Total Dietary Fiber (TDF) means (Resistant starch)
**"expected" bread TDF is based on control loaf fiber plus raw starch fiber.

A further series of test bakings were done according to the formulations set out below:

| | Batch Nos. | | | | | |
|---|---|---|---|---|---|---|
| Ingredients | 1 | 2 | 3 | 4 | 5 | 6 |
| Flour (g) | 1000 | 950 | 900 | 850 | 800 | 750 |
| Starch A.958 (g) | 0 | 50 | 100 | 150 | 200 | 250 |
| Gluten (g) | 0 | 10 | 20 | 30 | 40 | 50 |
| Salt (g) | 18 | 18 | 18 | 18 | 18 | 18 |
| Improver (g) | 15 | 15 | 15 | 15 | 15 | 15 |
| Fat (g) | 20 | 20 | 20 | 20 | 20 | 20 |
| Yeast(g) | 12 | 12 | 12 | 12 | 12 | 12 |
| Water (ml) | 600 | 610 | 630 | 650 | 670 | 700 |

Each batch was processed in a conventional manner. The total dietary fiber for each batch was found to be:

| Batch No. | Total Dietary Fiber (% dsb) |
|---|---|
| 1 | 5.4 |
| 2 | 7.1 |
| 3 | 9.1 |
| 4 | 10.8 |
| 5 | 12.8 |
| 6 | 14.5 |

In addition, it was noted that inclusion of the high amylose starch did not have an adverse effect on crumb color, whilst increasing levels of high amylose starch led to increasing dough water absorption levels. Generally it was concluded that the high amylose starch was an excellent source of dietary fiber for inclusion in bread since any detrimental effect on load volume and crumb firmness could be readily overcome by appropriate formulation changes known to those skilled in the art.

It has also been found that gluten free bread which is high in dietary fiber may be produced using the high amylose starch of the invention. This is important as conventional gluten free bread, which is consumed by sufferers of celiac disease, is generally low in dietary fiber. For guidance, up to about 15% may be incorporated into a gluten free bread to yield a dietary fiber content of about 10%.

As well as being able to provide enhanced dietary fiber content in bread, the high amylose starch acts to reduce stalling on storage of the bread, by it is thought, reducing the level of amylopectin and helping to maintain the moisture content of the bread.

Noodles

Typically, up to about 24% of high amylose starch may be used as a flour replacement in spaghetti. This yields a dietary fiber content of up to about 8.7%.

In use, it has been found that spaghetti made from high amylose starch has less of the "speckiness" which is usually associated with the addition of more conventional fiber additives such as bran to achieve higher dietary fiber content. Furthermore, during cooking, the spaghetti is less sticky and remains al denote for longer.

Other Food Products

It has been found that, in addition to providing a dietary fiber benefit in instant noodles, these products have a greater crispiness as compared with conventional formulated products.

In the formulation of biscuits and crackers, it is possible to overcome the use of a laminator by using the high amylose starch of the invention. This is due to the expansion, popping effect which serves to impart a lighter texture to such products.

INDUSTRIAL APPLICABILITY

From the foregoing description it will be evident that the present invention, insofar as it relates to food compositions that are intended for human consumption, provides a means for enhancing the dietary fiber content of a variety of food compositions. Not only does this have obvious nutritional benefits, but it allows for the production of food compositions having physical characteristics not previously known with conventional formulations.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of increasing the feed efficiency of a mammal during a feeding period, the method comprising:
    feeding the mammal a fluid animal feed comprising resistant starch in an amount effective to increase feed efficiency during the feeding period wherein the ratio of resistant starch to fluid non-resistant starch animal feed is from 3:100 to 10:100 based on the dry weight of the resistant starch and the dry weight of the non-resistant starch animal feed components
    wherein the mammal is a calf and the resistant starch is provided to the calf in combination with corn starch.

2. The method of claim 1 wherein the fluid animal feed is a milk replacer and the amount of milk replacer provided to the ruminant is greater than about one pound per day, based upon the dry weight of the milk replacer.

3. The method of claim 1 wherein the fluid animal feed is a milk replacer and the weight ratio of the resistant starch to the milk replacer ranges from about 5:100 to about 7:100 based upon the dry weight of the resistant starch and the dry weight of the milk replacer.

4. A method of increasing the amount of weight gained by a mammal during a feeding period, the method comprising:
    feeding the mammal a fluid animal feed comprising resistant starch during the feeding period wherein the ratio of resistant starch to fluid non-resistant starch animal feed is from 3:100 to 10:100 based on the dry weight of the resistant starch and the dry weight of the non-resistant starch animal feel components wherein the mammal is a ruminant and the resistant starch is provided to the ruminant in combination with corn starch.

5. The method of claim 4 wherein the fluid animal feed is a milk replacer and the amount of milk replacer provided to the ruminant is greater than about one pound per day, based upon the dry weight of the milk replacer.

6. The method of claim 4 wherein the fluid animal feed is a milk replacer and the weight ratio of the resistant starch to the milk replacer ranges from about 3:100 to about 7:100, based upon the dry weight of the resistant starch and the dry weight of the milk replacer.

7. A method of feeding a mammal, the method comprising:
    providing the mammal with a fluid animal feed during a feeding period, the fluid animal feed comprising an animal feed component and the mammal provided with more than about 1.25 pounds of the animal feed component per day, based on the dry weight of the animal feed component, during the feeding period wherein the mammal is a ruminant; and
    providing resistant starch to the mammal during the feeding period wherein the ratio of resistant starch to animal feed is from 3:100 to 10:100 based on the dry weight of the resistant starch and the dry weight of the non-resistant starch animal feed components.

8. The method of claim 7 wherein the fluid animal feed is a fluid milk replacer.

9. The method of claim 7 wherein the weight ratio of the resistant starch to the non-resistant starch animal feed component ranges from about 5:100 to about 7:100, based upon the dry weight of the resistant starch and the dry weight of the animal feed component.

10. The method of claim 9 wherein the animal feed component is dry milk replacer.

11. The method of claim 9 wherein the animal feed component is a powdered milk replacer, a pelleted milk replacer, a granular milk replacer, or any of these in any combination.

12. The method of claim 7 wherein the ruminant is provided with at least about 1.5 pounds of the animal feed component per day, based on the dry weight of the animal feed component.

13. The method of claim 7 wherein the ruminant is provided with at least about 2.0 pounds of the animal feed component per day, based on the dry weight of the animal feed component.

14. The method of claim 7 wherein the resistant starch is provided to the ruminant in combination with corn starch.

15. A method of increasing the feed efficiency of a mammal during a feeding period, the method comprising:
feeding the mammal a fluid animal feed comprising resistant starch in an amount effective to increase the feed efficiency of the mammal during a feeding period during the feeding period wherein the ratio of resistant starch to fluid non-resistant starch animal feed is from 3:100 to 10:100 based on the dry weight of the resistant starch and the dry weight of the non-resistant starch animal feed components wherein the mammal is a ruminant, the fluid animal feed is a milk replacer and the amount of milk replacer provided to the ruminant is greater than about one pound per day, based upon the dry weight of the milk replacer.

16. A method of increasing the amount of weight gained by a mammal during a feeding period, the method comprising:
feeding the mammal a fluid animal feed comprising resistant starch in an amount effective to increase the amount of weight gained by the mammal during the feeding period wherein the ratio of resistant starch to fluid non-resistant starch animal feed is from 3:100 to 10:100 based on the dry weight of the resistant starch and the dry weight of the non-resistant starch animal feel components wherein the mammal is a ruminant, the fluid animal feed is a milk replacer and the amount of milk replacer provided to the ruminant is greater than about one pound per day, based upon the dry weight of the milk replacer.

* * * * *

UNITED STATES PATENT AND TRADEMARK OFFICE
CERTIFICATE OF CORRECTION

PATENT NO. : 7,252,836 B2  Page 1 of 1
APPLICATION NO. : 10/340935
DATED : August 7, 2007
INVENTOR(S) : Ian L. Brown et al.

It is certified that error appears in the above-identified patent and that said Letters Patent is hereby corrected as shown below:

In the Claims:

Column 54, line 37, "feel" should be -- feed --.

Column 56, line 19, "feel" should be -- feed --.

Signed and Sealed this

Twenty-fifth Day of December, 2007

JON W. DUDAS
*Director of the United States Patent and Trademark Office*